United States Patent
Dimpsey et al.

(10) Patent No.: US 7,526,616 B2
(45) Date of Patent: *Apr. 28, 2009

(54) METHOD AND APPARATUS FOR PREFETCHING DATA FROM A DATA STRUCTURE

(75) Inventors: Robert Tod Dimpsey, Austin, TX (US); Frank Eliot Levine, Austin, TX (US); Robert John Urquhart, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 500 days.

This patent is subject to a terminal disclaimer.

(21) Appl. No.: 10/806,866

(22) Filed: Mar. 22, 2004

(65) Prior Publication Data

US 2005/0210198 A1  Sep. 22, 2005

(51) Int. Cl.
*G06F 12/00* (2006.01)
(52) U.S. Cl. .................................. 711/137; 711/118
(58) Field of Classification Search ................. 711/118, 711/137
See application file for complete search history.

(56) References Cited

U.S. PATENT DOCUMENTS

| | | | |
|---|---|---|---|
| 4,291,371 A | 9/1981 | Holtey | 364/200 |
| 4,316,245 A | 2/1982 | Luu et al. | |
| 5,103,394 A | 4/1992 | Blasciak | 395/575 |
| 5,113,507 A | 5/1992 | Jaeckel | |
| 5,212,794 A | 5/1993 | Pettis et al. | |
| 5,276,833 A | 1/1994 | Auvinen et al. | |
| 5,287,481 A | 2/1994 | Lin | |
| 5,394,529 A | 2/1995 | Brown, III et al. | |
| 5,537,572 A | 7/1996 | Michelsen et al. | |
| 5,544,342 A * | 8/1996 | Dean | 711/119 |
| 5,581,778 A | 12/1996 | Chin et al. | |
| 5,603,004 A * | 2/1997 | Kurpanek et al. | 711/118 |
| 5,652,858 A * | 7/1997 | Okada et al. | 711/137 |
| 5,659,679 A | 8/1997 | Alpert et al. | |
| 5,691,920 A | 11/1997 | Levine et al. | 364/551.01 |

(Continued)

FOREIGN PATENT DOCUMENTS

JP  2000029731  12/1999

(Continued)

OTHER PUBLICATIONS

"Cache Miss Director—A Means of Prefetching Cache Missed Lines", Aug. 1, 1982, IBM Technical Disclosure Bulletin, vol. 25, Issue 3A, p. 1286.*

(Continued)

*Primary Examiner*—Sanjiv Shah
*Assistant Examiner*—Arpan Savla
(74) *Attorney, Agent, or Firm*—Yee & Associates, P.C.; Herman Rodriguez

(57) ABSTRACT

A method, apparatus, and computer instructions for providing hardware assistance to prefetch data during execution of code by a process or in the data processing system. In response to loading of an instruction in the code into a cache, a determination is made, by the processor unit, as to whether metadata for a prefetch is present for the instruction. In response to metadata being present for the instruction, selectively prefetching data, from within a data structure using the metadata, into the cache in a processor.

7 Claims, 9 Drawing Sheets

U.S. PATENT DOCUMENTS

| | | | |
|---|---|---|---|
| 5,708,803 A * | 1/1998 | Ishimi et al. ................ 712/233 |
| 5,710,881 A | 1/1998 | Gupta et al. |
| 5,752,062 A | 5/1998 | Gover et al. |
| 5,761,103 A | 6/1998 | Oakland et al. |
| 5,768,500 A | 6/1998 | Agrawal et al. |
| 5,774,724 A | 6/1998 | Heisch ........................ 395/704 |
| 5,794,028 A | 8/1998 | Tran |
| 5,797,019 A | 8/1998 | Levine et al. |
| 5,805,879 A | 9/1998 | Hervin et al. |
| 5,822,763 A | 10/1998 | Baylor et al. |
| 5,822,790 A * | 10/1998 | Mehrotra .................... 711/213 |
| 5,887,159 A | 3/1999 | Burrows |
| 5,928,334 A | 7/1999 | Mandyam et al. |
| 5,930,508 A | 7/1999 | Faraboschi et al. ......... 395/706 |
| 5,937,437 A | 8/1999 | Roth et al. .................. 711/202 |
| 5,938,760 A | 8/1999 | Levine et al. |
| 5,938,778 A | 8/1999 | John, Jr. et al. .............. 714/45 |
| 5,940,618 A | 8/1999 | Blandy et al. |
| 5,950,003 A | 9/1999 | Kaneshiro et al. |
| 5,950,009 A | 9/1999 | Bortnikov et al. |
| 5,966,537 A | 10/1999 | Ravichandran ............. 395/709 |
| 5,966,538 A | 10/1999 | Granston et al. |
| 5,970,439 A | 10/1999 | Levine et al. |
| 5,987,250 A | 11/1999 | Subrahmanyam ........... 395/704 |
| 6,006,033 A | 12/1999 | Heisch |
| 6,009,514 A | 12/1999 | Henzinger et al. |
| 6,026,235 A | 2/2000 | Shaughnessy |
| 6,070,009 A | 5/2000 | Dean et al. .................. 395/704 |
| 6,073,215 A * | 6/2000 | Snyder ....................... 711/137 |
| 6,094,709 A | 7/2000 | Baylor et al. |
| 6,101,524 A | 8/2000 | Choi et al. ................... 709/102 |
| 6,119,075 A | 9/2000 | Dean et al. |
| 6,134,676 A | 10/2000 | VanHuben et al. ............ 714/39 |
| 6,189,072 B1 | 2/2001 | Levine et al. |
| 6,189,141 B1 | 2/2001 | Benitez et al. ................ 717/4 |
| 6,189,142 B1 | 2/2001 | Johnston et al. |
| 6,192,513 B1 | 2/2001 | Subrahmanyam ............. 717/5 |
| 6,206,584 B1 | 3/2001 | Hastings ................ 395/183.11 |
| 6,223,338 B1 | 4/2001 | Smolders ...................... 717/4 |
| 6,233,679 B1 | 5/2001 | Holmberg |
| 6,237,141 B1 | 5/2001 | Holzle et al. |
| 6,243,804 B1 | 6/2001 | Cheng ........................ 712/228 |
| 6,256,771 B1 | 7/2001 | O'Neil et al. |
| 6,256,775 B1 | 7/2001 | Flynn ............................ 717/4 |
| 6,285,974 B1 | 9/2001 | Mandyam et al. |
| 6,286,132 B1 | 9/2001 | Tanaka et al. .................. 717/4 |
| 6,324,689 B1 | 11/2001 | Lowney et al. ................. 717/9 |
| 6,330,662 B1 | 12/2001 | Patel et al. .................. 712/236 |
| 6,349,406 B1 | 2/2002 | Levine et al. |
| 6,351,844 B1 | 2/2002 | Bala .............................. 717/4 |
| 6,374,364 B1 | 4/2002 | McElroy et al. ............... 714/10 |
| 6,381,679 B1 | 4/2002 | Matsubara et al. |
| 6,430,741 B1 | 8/2002 | Mattson, Jr. et al. ......... 717/154 |
| 6,442,585 B1 | 8/2002 | Dean et al. .................. 709/108 |
| 6,446,029 B1 | 9/2002 | Davidson et al. ............ 702/186 |
| 6,480,938 B2 | 11/2002 | Vondran, Jr. ................ 711/125 |
| 6,505,292 B1 | 1/2003 | Witt |
| 6,539,458 B2 | 3/2003 | Holmberg |
| 6,542,985 B1 | 4/2003 | Johnson et al. |
| 6,549,959 B1 | 4/2003 | Yates et al. |
| 6,549,998 B1 | 4/2003 | Pekarich et al. |
| 6,594,820 B1 | 7/2003 | Ungar |
| 6,601,233 B1 | 7/2003 | Underwood |
| 6,631,514 B1 | 10/2003 | Le |
| 6,636,950 B1 | 10/2003 | Mithal et al. |
| 6,647,301 B1 | 11/2003 | Sederlund et al. |
| 6,662,295 B2 | 12/2003 | Yamaura |
| 6,665,776 B2 * | 12/2003 | Jouppi et al. ................ 711/137 |
| 6,681,387 B1 | 1/2004 | Hwu et al. |
| 6,687,794 B2 * | 2/2004 | Malik ........................ 711/137 |
| 6,687,807 B1 * | 2/2004 | Damron ...................... 712/205 |
| 6,721,875 B1 | 4/2004 | McCormick et al. |
| 6,735,666 B1 | 5/2004 | Koning |
| 6,772,322 B1 | 8/2004 | Merchant et al. |
| 6,775,825 B1 | 8/2004 | Grumann et al. |
| 6,782,454 B1 * | 8/2004 | Damron ...................... 711/137 |
| 6,832,296 B2 * | 12/2004 | Hooker ....................... 711/137 |
| 6,848,029 B2 * | 1/2005 | Coldewey .................... 711/137 |
| 6,848,030 B2 * | 1/2005 | Tokar et al. .................. 711/137 |
| 6,918,106 B1 | 7/2005 | Burridge et al. |
| 6,925,424 B2 | 8/2005 | Jones et al. |
| 6,961,681 B1 | 11/2005 | Choquier et al. |
| 6,961,925 B2 | 11/2005 | Callahan, II et al. |
| 6,966,057 B2 | 11/2005 | Lueh |
| 6,973,417 B1 | 12/2005 | Maxwell et al. |
| 6,973,542 B1 | 12/2005 | Schmuck et al. |
| 7,131,115 B2 | 10/2006 | Hundt et al. |
| 7,181,723 B2 | 2/2007 | Luk et al. |
| 7,313,655 B2 * | 12/2007 | Hsu ........................... 711/137 |
| 2001/0032305 A1 | 10/2001 | Barry ......................... 712/34 |
| 2002/0019976 A1 | 2/2002 | Patel et al. .................. 717/137 |
| 2002/0073406 A1 | 6/2002 | Gove |
| 2002/0124237 A1 | 9/2002 | Sprunt et al. ................ 717/127 |
| 2002/0129309 A1 | 9/2002 | Floyd et al. ................. 714/724 |
| 2002/0147965 A1 | 10/2002 | Swaine et al. ............... 717/124 |
| 2002/0157086 A1 | 10/2002 | Lewis et al. |
| 2002/0199179 A1 | 12/2002 | Lavery et al. ............... 717/158 |
| 2003/0014741 A1 | 1/2003 | Megiddo et al. |
| 2003/0040955 A1 | 2/2003 | Anaya et al. |
| 2003/0066055 A1 | 4/2003 | Spivey |
| 2003/0101367 A1 | 5/2003 | Bartfai et al. |
| 2003/0131343 A1 | 7/2003 | French et al. |
| 2003/0135719 A1 | 7/2003 | DeWitt, Jr. et al. |
| 2003/0191900 A1 * | 10/2003 | Hooker ....................... 711/137 |
| 2003/0225917 A1 | 12/2003 | Partamian et al. |
| 2004/0049712 A1 | 3/2004 | Betker et al. |
| 2004/0153612 A1 | 8/2004 | Mutz et al. |
| 2004/0194076 A1 | 9/2004 | Comp et al. |
| 2004/0205302 A1 | 10/2004 | Cantrill |
| 2004/0268316 A1 | 12/2004 | Fisher et al. |
| 2005/0091456 A1 | 4/2005 | Huck |
| 2005/0108483 A1 | 5/2005 | Bungo |

FOREIGN PATENT DOCUMENTS

| | | |
|---|---|---|
| JP | 2000347863 | 12/2000 |

OTHER PUBLICATIONS

Disclosed Anonymously, "Method for the dynamic prediction of nonsequential accesses", Sep. 25, 2002, ip.com, IPCOM000009888D.*

Cohen et al., "Hardware-Assisted Characterization of NAS Benchmarks", Cluster Computing, vol. 4, No. 3, Jul. 2001, pp. 189-196.

Talla et al., "Evaluating Signal Processing and Multimedia Applications on SIMD, VLIW and Super Scalar Architectures", International Conference on Computer Design, Austin, Sep. 17-20, 2000, pp. 163-172.

Iwasawa et al., "Parallelization Method of Fortran DO Loops by Parallelizing Assist System", Transactions of Information Processings Society of Japan, vol. 36, No. 8, Aug. 1995, pp. 1995-2006.

Talla et al., "Execution Characteristics of Multimedia Applications on a Pentium II Processor", IEEE International Performance, Computing, and Communications Conference, 19th, Phoenix, Feb. 20-22, 2000, pp. 516-524.

IBM Research Disclosure Bulletin 444188, "Enable Debuggers as an Objective Performance Measurement Tool for Software Development Cost Reduction", Apr. 2001, pp. 686-688.

U.S. Appl. No. 09/435,069, Davidson et al., Method and Apparatus for Instruction Sampling for Performance Monitoring and Debug, filed Nov. 4, 1999.

U.S. Appl. No. 08/538,071, Gover et al., Method and System for Selecting and Distinguishing an Event Sequence using an Effective Address in a Processing System, filed Oct. 2, 1995.

U.S. Appl. No. 10/675,777, DeWitt, Jr. et al., Method and Apparatus for Counting Instruction Execution and Data Accesses, filed Sep. 30, 2003.

U.S. Appl. No. 10/674,604, DeWitt, Jr. et al., Methods and Apparatus for Selectively Counting Instructions and Data Accesses, filed Sep. 30, 2003.

U.S. Appl. No. 10/675,831, DeWitt, Jr. et al., Method and Apparatus for Generating Interrupts Upon Execution of Marked Instructions and Upon Access to Marked Memory Locations, filed Sep. 30, 2003.

U.S. Appl. No. 10/675,778, DeWitt, Jr. et al., Method and Apparatus for Counting Data Accesses and Instruction Executions that Exceed a Threshold, filed Sep. 30, 2003.

U.S. Appl. No. 10/675,776, DeWitt, Jr. et al., Method and Apparatus for Counting Execution of Specific Instructions and Accesses to Specific Data Locations, filed Sep. 30, 2003.

U.S. Appl. No. 10/675,751, DeWitt, Jr. et al., Method and Apparatus for Debug Support for Individual Instructions and Memory Locations, filed Sep. 30, 2003.

U.S. Appl. No. 10/675,721, Levine et al., Method and Apparatus to Autonomically Select Instructions for Selective Counting, filed Sep. 30, 2003.

U.S. Appl. No. 10/674,642, Levine et al., Method and Apparatus to Autonomically Count Instruction Execution for Applications, filed Sep. 30, 2003.

U.S. Appl. No. 10/674,606, Levine et al., Method and Apparatus to Autonomically Take an Execution on Specified Instructions, filed Sep. 30, 2003.

U.S. Appl. No. 10/675,783, Levine et al., Method and Apparatus to Autonomically Profile Applications, filed Sep. 30, 2003.

U.S. Appl. No. 10/675,872, DeWitt, Jr. et al., Method and Apparatus for Counting Instruction and Memory Location Ranges, filed Sep. 30, 2003.

U.S. Appl. No. 10/757,250, Levine et al., Method and Apparatus for Maintaining Performance Monitoring Structures in a Page Table for use in Monitoring Performance of a Computer Program, filed Jan. 14, 2004.

U.S. Appl. No. 10/757,192, DeWitt, Jr. et al., Method and Apparatus for Providing Pre and Post Handlers for Recording Events, filed Jan. 14, 2004.

U.S. Appl. No. 10/757,192, DeWitt, Jr. et al., Method and Apparatus for Determining Computer Program Flows Autonomically Using Hardware Assisted Thread Stack Tracking and Cataloged Symbolic Data, filed Mar. 18, 2004.

U.S. Appl. No. 10/757,227, DeWitt, Jr. et al., Method and Apparatus for Autonomically Moving Cache Entries to Dedicated Storage when False Cache Line Sharing is Detected, filed Jan. 14, 2004.

U.S. Appl. No. 10/757,197, DeWitt, Jr. et al., Method and Apparatus for Optimizing Code Execution Using Annotated Trace Information having Performance Indicator and Counter Information, filed Jan. 14, 2004.

U.S. Appl. No. 10/807,094, Dimpsey et al., Method and Apparatus for Providing Hardware Assistance for Code Coverage, filed Mar. 22, 2004.

U.S. Appl. No. 10/808,716, Dimpsey et al., Method and Apparatus for Autonomic Test Case Feedback Using Hardware Assistance for Code Coverage, filed Mar. 22, 2004.

U.S. Appl. No. 10/806,576, Dimpsey et al., Method and Apparatus for Hardware Assistance for Data Access Coverage, filed Mar. 22, 2004.

U.S. Appl. No. 10/806,633, Dimpsey et al., Method and Apparatus for Providing Hardware Assistance for Data Access Coverage on Dynamically Allocated Data, filed Mar. 22, 2004.

U.S. Appl. No. 10/806,917, Dimpsey et al., Method and Apparatus for Autonomic Test Case Feedback Using Hardware Assistance for Data Coverage, filed Mar. 22, 2004.

U.S. Appl. No. 10/806,871, Dimpsey et al., Method and Apparatus for Hardware Assistance for Prefetching Data, filed Mar. 22, 2004.

Tanenbaum, "Structured Computer Organization", 1984, Prentice-Hall, Inc., $2^{nd}$ Edition, pp. 10-12.

Torrellas et al., "False Sharing and Spatial Locality in Multiprocessor Caches", Jun. 1994, IEEE Transactions on Computers, vol. 43, No. 6, pp. 651-663.

Rothman et al., "Analysis of Shared Memory Misses and Reference Patterns", 2000, IEEE, pp. 187-198.

Wikipedia "JavaServer Pages" downloaded Jan. 24, 2006 http://en.wikipedia.org/wiki/JavaServer_Pages.

"Hardware Cycle Based memory Residency", IBM, May 22, 2003, ip.com, IPCOM000012728D, pp. 1-2.

Hyde, "The Art of Assembly Language", 2001, Linux Edition, pp. 247-248, retrieved Mar. 1, 2005 from http://webster.cs.ucr.edu/AoA/Linux/PDFs/0_PDFIndexLinux.html.

Jeong et al., "Cost Sensitive Cache Replacement Algorithms", Jun. 2002, Second Workshop on Cashing, Coherence and Consistency, NY, pp. 1-14.

Ramirez et al., "The Effect of Code Reordering on Branch Prediction", Proceedings of the International Conference on Parallel Architectures and Compilation Techniques, Oct. 2000, pp. 189-198.

Yang et al., "Improving Performance by Branch Reordering", Proceedings of the ACM SIGPLAN 1998 Conference onProgramming Language Design and Implementation, Montreal Canada, 1008, pp. 130-141.

Conte et al., "Accurate and Practical Profile-Driven Compilation Using the Profile Buffer", Proceedings of the 29th Annual ACM/IEEE International Symposium on Microarchitecture, Paris, France, 1996, pp. 36-45.

Conte et al., "Using Branch Handling Hardware to Support Profile-Driven Optimization", Proceedings of the 27th Annual International Symposium on Microarchitecture, San Jose CA, 1994, pp. 12-21.

Fisher, "Trace Scheduling: A Technique for Global Microcode Compaction", IEEE Transactions on Computers, vol. C30, No. 7, Jul. 1981, pp. 478-490.

Chang et al., "Using Profile Information to Assist Classic Code Optimizations", Software Pract. Exper. 21, Dec. 1991, pp. 1301-1321.

Schmidt et al., "Profile-Directed Restructuring of Operating System Code", IBM Systems Journal, 1998, vol. 37, No. 2, pp. 270-297.

Aho et al., "Compilers: Principles, Techniques, and Tools", Addison-Wesley, 1988, pp. 488-497.

Intel, "Intel IA-64 Architecture Software Developer's Manual", Revision 1.1, vol. 4, No. 245320.002, Jul. 2001.

* cited by examiner

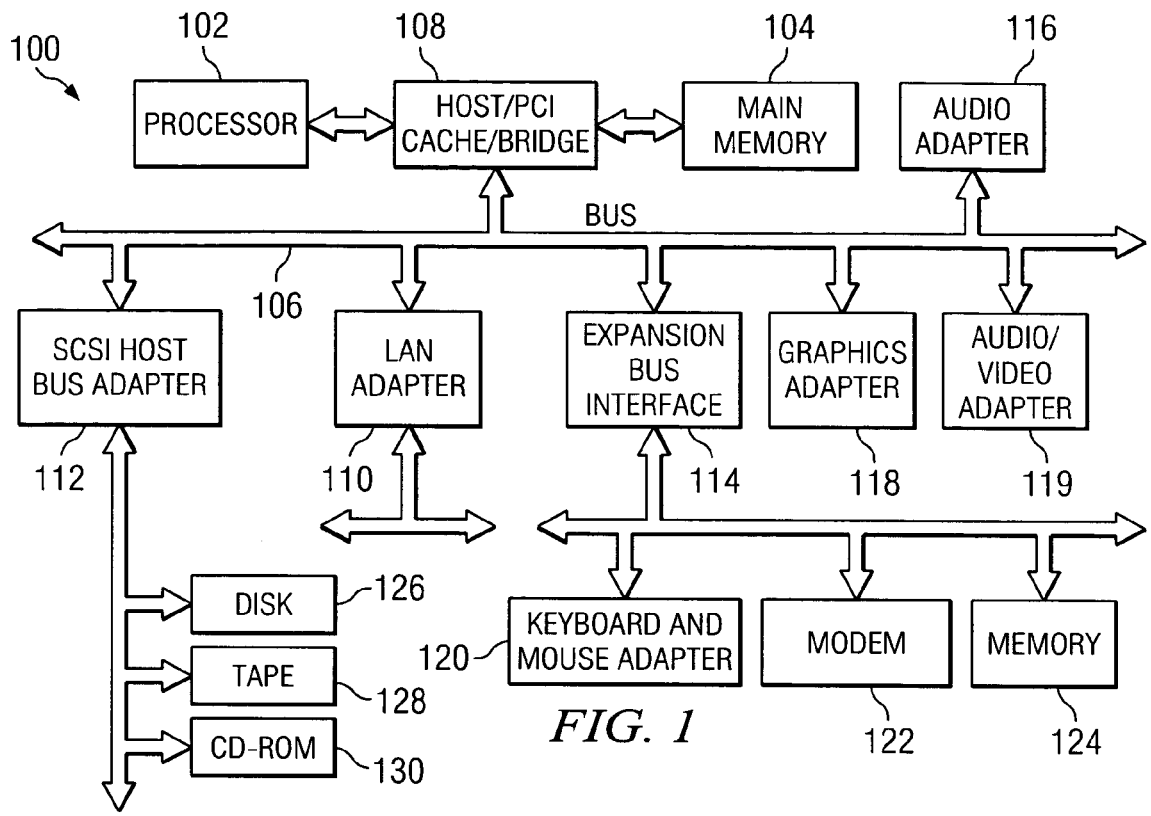
FIG. 1
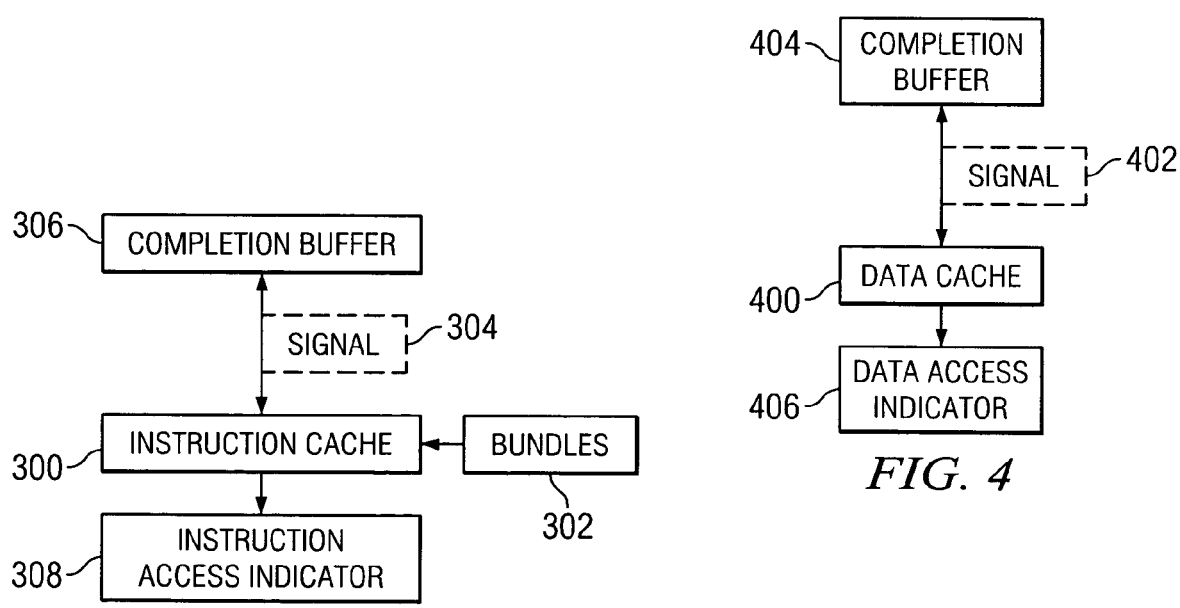
FIG. 3
FIG. 4

METHOD AND APPARATUS FOR PREFETCHING DATA FROM A DATA STRUCTURE

CROSS REFERENCE TO RELATED APPLICATIONS

The present invention is related to the following applications entitled "Method and Apparatus for Counting instruction Execution and Data Accesses", Ser. No. 10/675,777, filed on Sep. 30, 2003; "Method and Apparatus for Selectively Counting Instructions and Data Accesses", Ser. No. 10/674,604, filed on Sep. 30, 2003; "Method and Apparatus for Generating Interrupts Upon Execution of Marked Instructions and Upon Access to Marked Memory Locations", Ser. No. 10/675,831, filed on Sep. 30, 2003; "Method and Apparatus for Counting Data Accesses and Instruction Executions that Exceed a Threshold", Ser. No. 10/675,778, filed on Sep. 30, 2003; "Method and Apparatus for Counting Execution of Specific Instructions and Accesses to Specific Data Locations", Ser. No. 10/675,776, filed on Sep. 30, 2003; "Method and Apparatus for Debug Support for Individual Instructions and Memory Locations", Ser. No. 10/675,751, filed on Sep. 30, 2003; "Method and Apparatus to Autonomically Select Instructions for Selective Counting", Ser. No. 10/675,721, filed on Sep. 30, 2003; "Method and Apparatus 10 Autonomically Count Instruction Execution for Applications", Ser. No. 10/674,642, filed on Sep. 30, 2003; "Method and Apparatus to Autonomically Take an Exception on Specified Instructions", Ser. No. 10/674,606, filed on Sep. 30, 2003; "Method and Apparatus to Autonomically Profile Applications", Ser. No. 10/675,783, filed on Sep. 30, 2003; "Method and Apparatus for Counting Instruction and Memory Location Ranges", Ser. No. 10/675,872, filed on Sep. 30, 2003; "Method and Apparatus for Maintaining Performance Monitoring Structures in a Page Table for Use in Monitoring Performance of a Computer Program", Ser. No. 10/757,250, filed on Jan. 14, 2004; "Method and Apparatus for Providing Pre and Post Handlers for Recording Events", Ser. No. 10/757,192, filed on Jan. 14, 2004; "Method and Apparatus for Determining Computer Program Flows Autonomically Using Hardware Assisted Thread Stack Tracking and Cataloged Symbolic Data", Ser. No. 10/803,663. filed on Mar. 18, 2004; "Method and Apparatus for Autonomically Moving Cache Entries to Dedicated Storage When False Cache Line Sharing is Detected", Ser. No. 10/757,227, filed on Jan. 14, 2004; "Method and Apparatus for Optimizing Code Execution Using Annotated Trace Information Having Performance Indicator and Counter Information", Ser. No. 10/757,197, filed on Jan. 14, 2004; "Method and Apparatus for Providing Hardware Assistance for Code Coverage", Ser. No. 10/807,094, filed on Mar. 22, 2004; "Method and Apparatus for Autonomic Test Case Feedback Using Hardware Assistance for Code Coverage", Ser. No. 10/808,716, filed on Mar. 22, 2004; "Method and Apparatus for Hardware Assistance for Data Access Coverage", Ser. No. 10/806,576, filed on Mar. 22, 2004; "Method and Apparatus for Providing Hardware Assistance for Data Access Coverage on Dynamically Allocated Data", Ser. No. 10/806,633, filed on Mar. 22, 2004; "Method and Apparatus for Autonomic Test Case Feedback Using Hardware Assistance for Data Coverage", Ser. No. 10/806,917, filed on Mar. 22, 2004; and "Method and Apparatus for Hardware Assistance for Prefetching Data", Ser. No. 10/806,871, filed on Mar. 22, 2004. All of the above related applications are assigned to the same assignee, and incorporated herein by reference.

BACKGROUND OF THE INVENTION

1. Technical Field

The present invention relates generally to an improved data processing system. In particular, the present invention provides a method and apparatus for obtaining performance data in a data processing system. Still more particularly, the present invention provides a method and apparatus for hardware assistance to software tools in obtaining code coverage data in a data processing system.

2. Description of Related Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time.

One known software performance tool is a trace tool. A trace tool may use more than one technique to provide trace information that indicates execution flows for an executing program. One technique keeps track of particular sequences of instructions by logging certain events as they occur. This technique is called a event-based profiling technique. For example, a trace tool may log every entry into, and every exit from, a module, subroutine, method, function, or system component. Alternately, a trace tool may log the requester and the amounts of memory allocated for each memory allocation request. Typically, a time-stamped record is produced for each such event. Corresponding pairs of records similar to entry-exit records also are used to trace execution of arbitrary code segments, starting and completing I/O or data transmission, and for many other events of interest.

In order to improve performance of code generated by various families of computers, it is often necessary to determine where time is being spent by the processor in executing code, such efforts being commonly known in the computer processing arts as locating "hot spots." Ideally, one would like to isolate such hot spots at the instruction and/or source line of code level in order to focus attention on areas which might benefit most from improvements to the code.

Another trace technique involves periodically sampling a program's execution flows to identify certain locations in the program in which the program appears to spend large amounts of time. This technique is based on the idea of periodically interrupting the application or data processing system execution at regular intervals. This technique is referred to as a sample-based profiling technique. At each interruption, information is recorded for a predetermined length of time or for a predetermined number of events of interest. For example, the program counter of the currently executing thread, which is an executable portion of the larger program being profiled, may be recorded at each interval. These values may be resolved against a load map and symbol table information for the data processing system at post-processing time and a profile of where the time is being spent may be obtained from this analysis.

Determining testing coverage is a difficult problem with currently available software tools. When testing code for programs, no easy mechanism is present to determine what code is executed and what code is not executed. This type of identification is also referred to as code coverage. Software techniques and tools are present for identifying code coverage. These techniques and tools, however, usually involve changing the code that is being tested. Having to change or instrument code is undesirable because such a process may be tedious and time consuming. Other types of techniques and tools are based on generating test cases from static analysis of the program. This type of methodology cannot guarantee full coverage in testing.

Creating tools such as these to find answers related to specific situations or problems can take much effort and can be very difficult to calibrate as the software tools themselves affect the system under test. The present invention recognizes that hardware assistance for tool development and problem analysis can significantly ease the amount of effort needed to develop software performance tools. Further, with the increasing density of processors, hardware assistance can be included to provide additional debug and analysis features.

Therefore, it would be advantageous to have an improved method, apparatus, and computer instructions for providing hardware assistance for performance tools analyzing the code coverage of code executed in data processing systems.

SUMMARY OF THE INVENTION

The present invention provides a method, apparatus, and computer instructions for providing hardware assistance to prefetch data during execution of code by a process or in the data processing system. In response to loading of an instruction in the code into a cache, a determination is made, by the processor unit, as to whether metadata for a prefetch is present for the instruction. In response to metadata being present for the instruction, selectively prefetching data, from within a data structure using the metadata, into the cache in a processor.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a block diagram of a data processing system in which the present invention may be implemented;

FIG. 3 is a diagram illustrating components used in processing instructions associated with indicators in accordance with a preferred embodiment of the present invention;

FIG. 4 is a diagram illustrating data flow for signals used to set indicators identifying memory locations that have been accessed in accordance with a preferred embodiment of the present invention;

DETAILED DESCRIPTION OF THE PREFERRED EMBODIMENT

Figure 2:
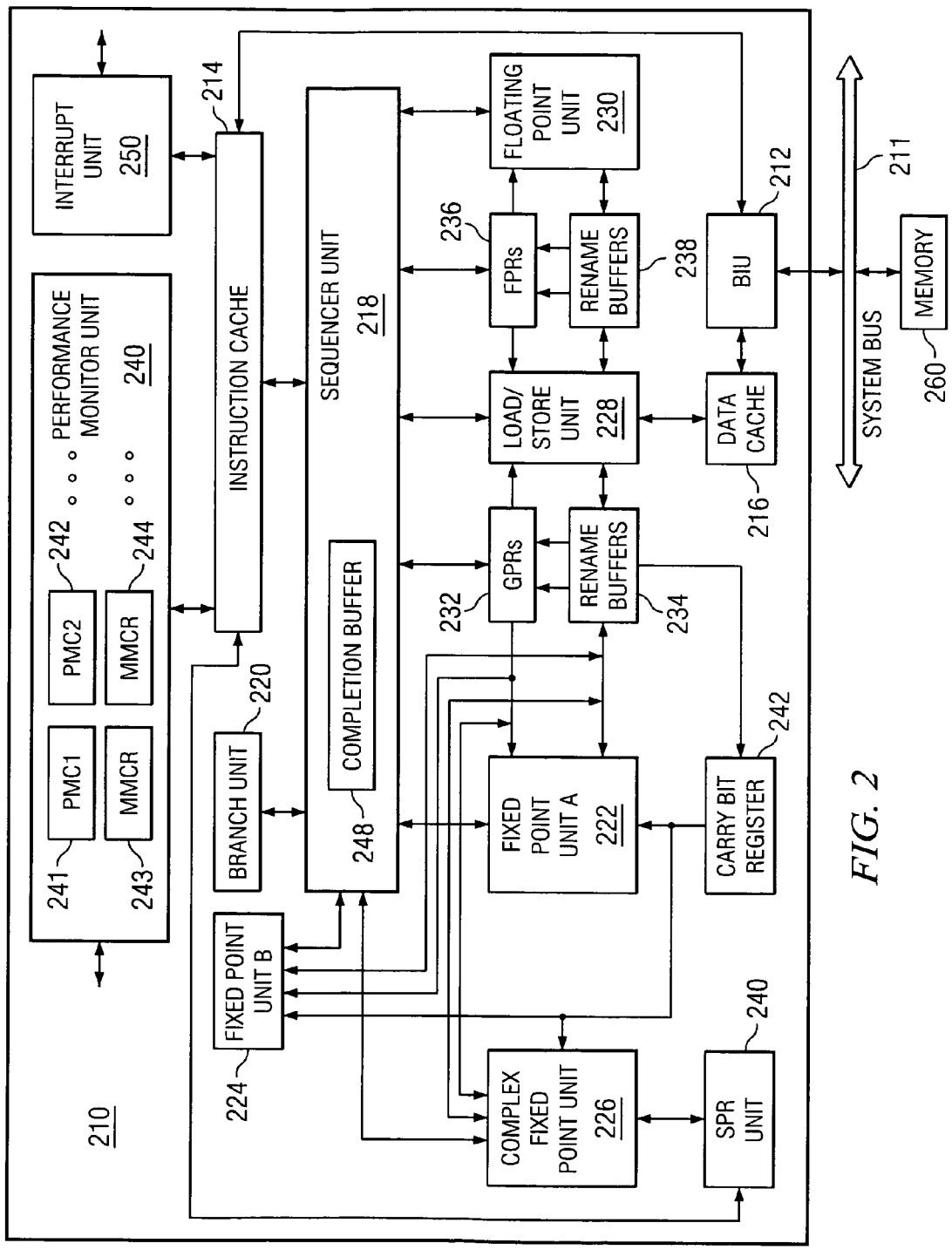
FIG. 2 is a block diagram of a processor system for processing information in accordance with a preferred embodiment of the present invention.

With reference now to FIG. 1, a block diagram of a data processing system is shown in which the present invention may be implemented. Client 100 is an example of a computer, in which code or instructions implementing the processes of the present invention may be located. Client 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards.

In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on client 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, client 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, client 100 may be a stand-alone system configured to be bootable without relying on some type of network communication interface, whether or not client 100 comprises some type of network communication interface. As a further example, client 100 may be a personal digital assistant (PDA), which is configured with ROM and/or flash ROM to provide. non-volatile memory for storing operating system files and/or user-generated data. The depicted example in FIG. 1 and above-described examples are not meant to imply architectural limitations.

The processes of the present invention are performed by processor 102 using computer implemented instructions, which may be located in a memory such as, for example, main memory 104, memory 124, or in one or more peripheral devices 126-130.

Turning next to FIG. 2, a block diagram of a processor system for processing information is depicted in accordance with a preferred embodiment of the present invention. Processor 210 may be implemented as processor 102 in FIG. 1.

In a preferred embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer ("RISC") techniques. As shown in FIG. 2, system bus 211 is connected to a bus interface unit ("BIU") 212 of processor 210. BIU 212 controls the transfer of information between processor 210 and system bus 211.

BIU 212 is connected to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in a preferred embodiment, the execution circuitry of processor 210 includes a number of processor units that are used to execute instructions. These processor units are also called execution units. The execution units include, for example, a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 242. FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register processing unit ("SPR unit") 240.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a Load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 260 connected to system bus 211. Moreover, data cache 216 is able to output (through BIU 212 and system bus 211) information from data cache 216 to system memory 260 connected to system bus 211. In response to a Store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 260 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As information is stored at a selected one of rename buffers 234, such information is associated with a storage location (e.g. one of GPRs 232 or CA register 242) as specified by the instruction for which the selected rename buffer is allocated. Information stored at a selected one of rename buffers 234 is copied to its associated one of GPRs 232 (or CA register 242) in response to signals from sequencer unit 218. Sequencer unit 218 directs such copying of information stored at a selected one of rename buffers 234 in response to "completing" the instruction that generated the information. Such copying is called "writeback", As information is stored at a selected one of rename buffers 238, such information is associated with one of FPRs 236. Information stored at a selected one of rename buffers 238 is copied to its associated one of FPRs 236 in response to signals from sequencer unit 218. Sequencer unit 218 directs such copying of information stored at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218. In the decode stage, sequencer unit 218 decodes up to four fetched instructions.

In the dispatch stage, sequencer unit 218 selectively dispatches up to four decoded instructions to selected (in response to the decoding in the decode stage) ones of execution units 220, 222, 224, 226, 228, and 230 after reserving rename buffer entries for the dispatched instructions' results (destination operand information). In the dispatch stage, operand information is supplied to the selected execution units for dispatched instructions. Processor 210 dispatches instructions in order of their programmed sequence.

In the execute stage, execution units execute their dispatched instructions and output results (destination operand information) of their operations for storage at selected entries in rename buffers 234 and rename buffers 238 as discussed further hereinabove. In this manner, processor 210 is able to execute instructions out-of-order relative to their programmed sequence.

In the completion stage, sequencer unit 218 indicates an instruction is "complete." Processor 210 "completes" instructions in order of their programmed sequence.

In the writeback stage, sequencer 218 directs the copying of information from rename buffers 234 and 238 to GPRs 232 and FPRs 236, respectively. Sequencer unit 218 directs such copying of information stored at a selected rename buffer. Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 226) may require more than one cycle. Accordingly, a variable delay may occur between a particular instruction's execution and completion stages in response to the variation in time required for completion of preceding instructions.

A completion buffer 248 is provided within sequencer 218 to track the completion of the multiple instructions which are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

In addition, processor 210 also includes processor monitoring unit 240, which is connected to instruction cache 214 as well as other units in processor 210. Operation of processor 210 can be monitored utilizing performance monitor unit 240, which in this illustrative embodiment is a software-accessible mechanism capable of providing detailed information descriptive of the utilization of instruction execution resources and storage control. Although not illustrated in FIG. 2, performance monitor unit 240 is coupled to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency.

Performance monitor unit 240 includes an implementation-dependent number (e.g., 2-8) of counters 241-242, labeled PMC1 and PMC2, which are utilized to count occurrences of selected events. Performance monitor unit 240 further includes at least one monitor mode control register (MMCR). In this example, two control registers, MMCRs 243 and 244 are present that specify the function of counters 241-242. Counters 241-242 and MMCRs 243-244 are preferably implemented as SPRs that are accessible for read or write via MFSPR (move from SPR) and MTSPR (move to SPR) instructions executable by CFXU 26. However, in one alternative embodiment, counters 241-242 and MMCRs 243-244 may be implemented simply as addresses in I/O space. In another alternative embodiment, the control registers and counters may be accessed indirectly via an index register. This embodiment is implemented in the IA-64 architecture in processors from Intel Corporation Additionally, processor 210 also includes interrupt unit 250, which is connected to instruction cache 214. Additionally, although not shown in FIG. 2, interrupt unit 250 is connected to other processor units within processor 210. Interrupt unit 250 may receive signals from other processor units and initiate an action, such as starting an error handling or trap process. In these examples, interrupt unit 250 is employed to generate interrupts and exceptions that may occur during execution of a program.

The present invention provides an ability to monitor the execution of specific instructions, as well as, the access of specific memory locations during the execution of a program. This type of determination also is referred to as code coverage. Specifically, a spare field may be used to hold an indicator that is associated with a specific instruction or memory location. This indicator may be set in response to execution of the instruction or access to the memory location. Examination of these indicators may be used to determine what code has been executed and what code has not been executed. A similar identification may be made as to what memory locations have or have not been accessed during execution of the code. Alternatively, the indicator may be stored in another location in association with the instruction or memory location.

In the case in which the indicator is placed in the instruction, a spare field is typically used, but in some cases the instruction may be extended to include the space needed for the indicator. With this case, the architecture of the processor may require changes. For example, a 64 bit architecture may be changed to a 65 bit architecture to accommodate the indicator. With respect to accesses of data, an indicator may be associated with the data or memory locations in which the data is located.

These indicators also are referred to as access indicators in these illustrative examples. Data access indicators are associated with memory locations, while instruction access indicators are associated with instructions. These indicators are typically initialized as being unset prior to execution of a program.

When the processor executes an instruction, the instruction access indicator associated with that instruction is set. Access to a memory location results in an indicator associated with that memory location being set. By examining indicators that have been set and not set, an identification of code coverage may be made. This examination may take place using processes implemented in a software tool designed to test code coverage. In this manner, code coverage, with respect to instructions and data access to memory locations, may be made without requiring statistical analysis or instrumentation of code.

Turning now to FIG. 3, a diagram illustrating components used in processing instructions associated with indicators is depicted in accordance with a preferred embodiment of the present invention. Instruction cache 300 receives bundles 302. Instruction cache 300 is an example of instruction cache 214 in FIG. 2. A bundle is a grouping of instructions. This type of grouping of instructions is typically found in an IA-64 processor, which is available from Intel Corporation. Instruction cache 300 processes instructions for execution.

As part of this processing of instructions, instruction cache 300 dispatches instructions to different execution units for execution. Signal 304 is received from completion buffer 306 when execution of the instruction has occurred. Completion buffer 306 is an example of a completion buffer, such as completion buffer 248 in FIG. 2. Signal 304 identifies the instruction for which execution has completed. This identification may take different forms. For example, entry numbers corresponding to entries in completion buffer 306 may be used to identify the instruction for which execution has completed. With this approach, instruction cache 300 knows where the specified instruction resides in its cache. Depending upon the processor implementation, other indicators may be used to identify which instruction has completed, such as, the position in cache 300.

When signal 304 is received, instruction cache 300 sets the instruction access indicator associated with the instruction that has been executed. In response to receiving signal 304, instruction cache 300 marks or sets instruction access indicator 308, which is associated with the instruction that has completed execution. This indicator may be in various locations, depending on the particular implementation. For example, instruction access indicator 308 may be located in a spare bit or field in the instruction, in a shadow memory, or in a page table.

With respect to the accessing of data in memory locations, the data and indicators are processed by a data cache, such as data cache 216 in FIG. 2, rather than by an instruction cache. Alternatively, the processor may have a combined data and instruction cache in which case, the indicators set as appropriate.

Although the illustrative examples show the generation of a signal indicating the completion of instruction execution being generated by completion buffer 306, this signal may be generated by other processor units depending on the particular processor architecture and configuration. For example, this unit may be the processing unit actually processing the instruction. Further, if the hardware does not support out-of-order operations, then the dispatching of an instruction to a processor unit for execution may be an acceptable point in time to indicate that the instruction has been executed. In other words, if an instruction is not speculatively executed, a dispatcher in the processor may mark the instruction as executed.

Turning to FIG. 4, a diagram illustrating data flow for signals used to set indicators identifying memory locations that have been accessed is depicted in accordance with a preferred embodiment of the present invention. Data cache 400 receives signal 402 from completion buffer 404 when an instruction has been executed. Signal 402 also includes an indication that data in a memory location has been accessed by the executed instruction.

In response to receiving signal 402, data access indicator 406 is set. This data access indicator is associated with the memory location accessed by the completed instruction. Metadata is used to map the association of indicators to memory locations in the case in which the data access indicators are not included in the memory locations themselves. The position of the instruction/data in the cache unit identifies the location in physical memory of the instruction/data. All currently available cache units have this capability. The cache unit also knows the location of the where to update the access indicators.

Figure 5:
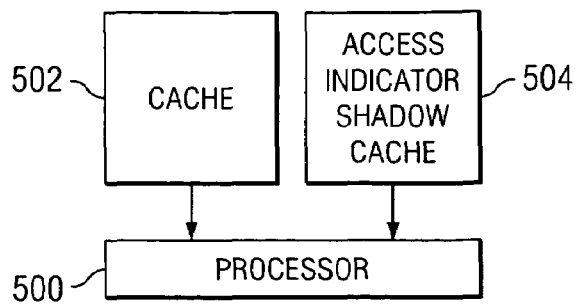
FIG. 5 is a diagram illustrating one mechanism for associating an access indicator with an instruction or memory location in accordance with a preferred embodiment of the present invention.

Turning next to FIG. 5, a diagram illustrating one mechanism for associating an access indicator with an instruction or memory location is depicted in accordance with a preferred embodiment of the present invention. Processor 500 receives instructions from cache 502. In this example, the indicators are not stored with the instructions or in the memory locations in which data is found. Instead, the indicators are stored in a separate area of storage, access indicator shadow cache 504. The storage may be any storage device, such as for example, a system memory, a flash memory, a cache, or a disk.

When processor 500 receives and then executes an instruction from cache 502, processor 500 sets an instruction access indicator in access indicator shadow cache 504, corresponding to the instruction from cache 502. A similar process is performed with respect to accesses of memory locations containing data. In one embodiment, a full shadow word is provided for each corresponding word that does not affect the actual data segments. In other words, processor 500 allows for the architecture or configuration of cache 502 to remain unchanged. In these examples, the mapping described is word for word. However, some other type of mapping may be used, such as a shadow bit per data word in which a bit in access indicator shadow cache 504 corresponds to one word of data.

With respect to this type of architecture, the compilers, using this feature, create the debug information in a separate work area from the data area themselves in a manner similar to debug symbols. When a module is loaded, the extra information, access indicators, is prepared by the loader so that it will be available to incorporate into access indicator shadow cache 504 when instructions are loaded into cache 502. These cache areas may be intermingled and either marked as such or understood by the mode of operation. Processor 500 sets the access indicators when related data accesses and instruction executions occur. In these examples, the process is programmed by a debugger or an analysis program to know whether to use the shadow information while the process is executing instructions.

Figure 6:
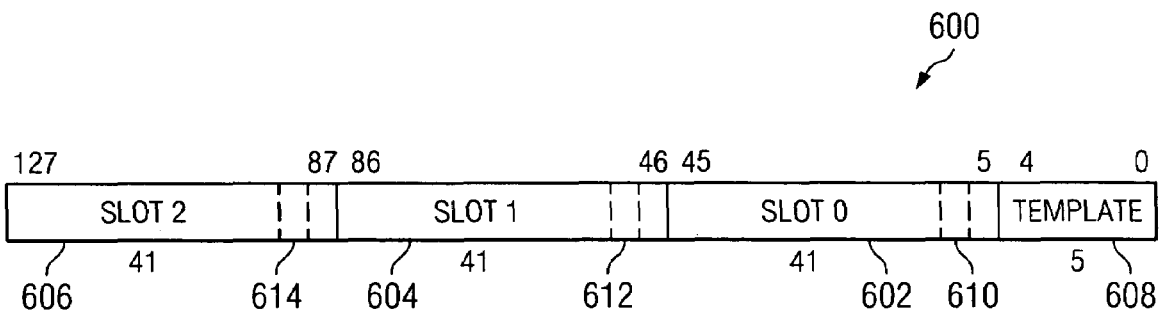
FIG. 6 is a diagram illustrating a bundle in accordance with a preferred embodiment of the present invention.

Turning next to FIG. 6, a diagram illustrating a bundle is depicted in accordance with a preferred embodiment of the present invention. Bundle 600 contains instruction slot 602, instruction 604, instruction slot 606 and template 608. As illustrated, bundle 600 contains 128 bits. Each instructions slot contains 41 bits, and template 608 contains 5 bits. Template 608 is used to identify stops within the current bundle and to map instructions within the slots to different types of execution units.

Spare bits within bundle 600 are used to hold indicators of the present invention. For example, indicators 610, 612, and 614 are located within instruction slots 602, 604, and 606, respectively. These indicators may take various forms and may take various sizes depending on the particular implementation. Indicators may use a single bit or may use multiple bits. In these illustrative examples, a single bit may be used to indicate that an instruction has been executed. A similar use of fields may be used for indicators that mark data or memory locations. When execution always starts at the first instruction in a bundle, as in the IA64 architecture, two bits may be used to indicate the last instruction executed. This is only needed for templates that have branch instructions. If basic blocks are being flagged, then only branch instructions and the instruction following a branch need be marked.

Figure 7:
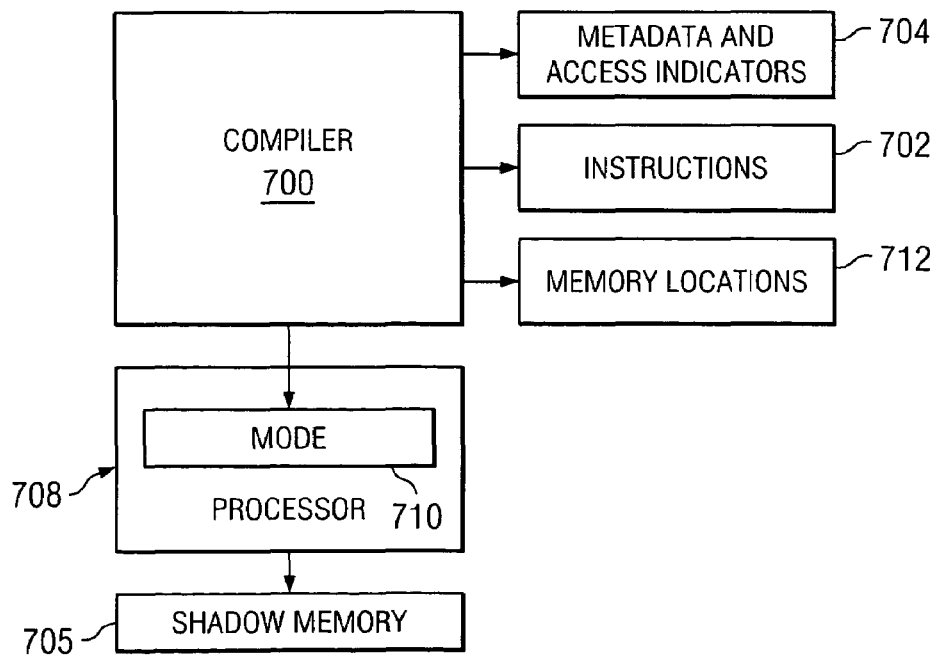
FIG. 7 is a block diagram illustrating components used for generating metadata, such as indicators, in accordance with a preferred embodiment of the present invention.

Turning to FIG. 7, a block diagram illustrating components used for generating metadata and access indicators is depicted in accordance with a preferred embodiment of the present invention. The compiler supports directives embedded in the source that indicate the metadata to be generated. The metadata is used to indicate what operation is to be performed, such as identifying which instructions or memory locations are to be associated with particular access indicators. In other words, the metadata defines the mapping of access indicators to individual instructions, groups of instructions, and memory locations. With respect to memory locations, the metadata may map access indicators to individual memory locations or to different groupings of memory locations with different sizes depending on the particular implementation. These access indicators are used by the hardware components in the processor to reflect updates made by these components when a memory location is accessed or an instruction is executed.

Compiler 700 may generate instructions 702 for execution and metadata and access indicators 704 for monitoring code coverage. As instruction or data cache pages are loaded into memory, the operating system program loader/linker and/or the performance monitoring program, reads metadata and access indicators 704 generated by compiler 700 and loads metadata and access indicators 704 into memory. Processor 708 may accept metadata and access indicators 704 in the format as generated by compiler 700 and populate shadow memory 705 with metadata and access indicators 704.

In an alternative embodiment, instead of the compiler, the performance monitoring program generates the metadata and access indicators.

In one embodiment the format simply has a metadata and/or an access indicator shadow cache entry for each of its block or sector references and moves metadata and access indicators 704 to its corresponding shadow entry or entries. Instead of having a shadow cache, the internal format of the cache itself may be modified to contain metadata and access indicators 704. In embodiments where the instruction stream itself is modified to contain the metadata, then either the loader updates the instruction stream to contain the appropriate metadata and/or access indicators and work areas or compiler 700 has generated the code to contain metadata and access indicators 704. In either case, after the code is loaded, the processor receives metadata and access indicators 704.

In addition, metadata and access indicators 704 may be placed into shadow memory 705 in association with instructions 702. Compiler 700 produces information in a table or debug data section. The performance monitoring program loads this information into shadow data areas in shadow memory 705. Alternatively, the debug areas may be automatically populated by the operating system or performance monitoring program and the processor working together.

Instructions 702 may then be executed by processor 708. Compiler 700 may set a register such as mode register 710 in processor 708. When this register is set, processor 708 looks at metadata and access indicators 704 in shadow memory 705 when executing instructions 702 to determine whether metadata and access indicators 704 are associated with instructions that are being executed in instructions 702.

If mode register 710 is not set, then metadata and access indicators 704 are ignored when instructions 702 are executed. Mode register 710 is used to turn on and off the feature of marking access to instructions in these illustrative embodiments.

The metadata within metadata and access indicator 704 may be used to set mode register 710 in addition to defining instructions or groups of instructions that are to be associated with access indicators. When an access indicator is associated on an instruction level basis, each instruction associated with an access indicator has its associated access indicator set when that instruction is executed. When an access indicator is associated with a group of instructions, this access indicator is set when any instruction in the group is executed in these illustrative examples.

A similar process may be performed with respect to data in memory locations 712. Depending on the particular implementation, metadata and access indicators 704 may be placed within the instruction or within the data, rather than in shadow memory 705. However, by placing metadata and access indicators 704 in shadow memory 705, the generation of metadata and access indicators 704 may be performed dynamically when metadata and access indicators 704 are placed in shadow memory 705.

This feature allows for selection and identification of instructions for code coverage monitoring to occur without having to modify the program. In other words, compiler 700 may generate metadata and access indicators 704 after instructions 702 have been compiled for execution by processor 708. Setting mode register 710 causes processor 708 to look for metadata and access indicators 704 in performance instrumentation shadow memory 705 without having to modify instructions 702. In these examples, the presence of an access indicator associated with an instruction or memory location causes processor 708 to set the access indicator when the execution of the instruction in instructions 702 occurs and/or data is accessed to the memory location in memory locations 712.

Figure 8:
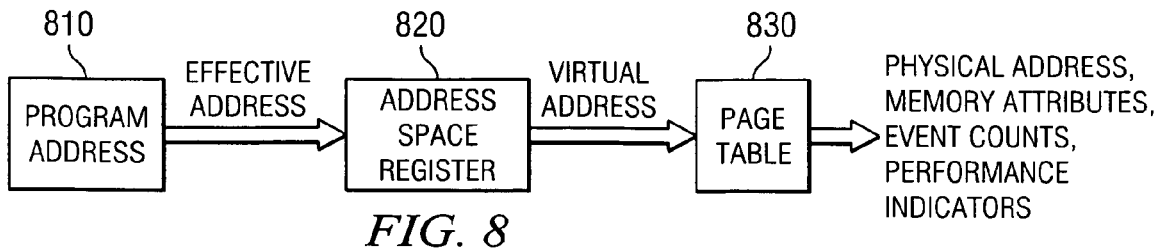
FIG. 8 is an exemplary block diagram of data flow in which a page table is used to translate the memory address specified by the program into a physical address in accordance with an exemplary embodiment of the present invention.

FIG. 8 illustrates an exemplary block diagram of data flow in which a page table is used to translate the memory address specified by the program into a physical address in accordance with an exemplary embodiment of the present invention. As shown in FIG. 8, a program address 810 (for data or instruction) is translated to a virtual address by way of the address space register 820 using one of the various means of specifying the active address space. The resultant virtual address is used by the processor to search page table 830 for a page descriptor in page table 830 that matches the virtual address. The contents of the matching page descriptor commonly contain the physical address and attributes associated with the virtual page. These contents are used to translate the virtual address to a physical address and to determine the attributes of the page (e.g., access rights).

In a further embodiment of the present invention, the page table is expanded to include additional fields for each entry for storing access indicators, such as instruction access indicators and data access indicators. When a process accesses the page table to perform virtual to physical page address mapping, these additional fields may be queried, values from these fields retrieved, and values in these fields updated based on the particular event causing the access to the page table.

Alternatively, to avoid any degradation of performance, the access indicator information in these fields may be cached in processor resources similar to a Translation Look-aside Buffer (TLB) or an Effective to Real Address Translation Buffer (ERAT). For example, a Performance Indicator Look-Aside Buffer (PILAB) may be provided in which the virtual to real address translation information and the performance indicator information provided in the above fields of the page table may be cached. When an instruction or data address access request is received, a lookup of the program or virtual address may be performed in the PILAB to obtain both the address translation information and the access indicator information. If the program or virtual address is not present in the PILAB, the page table may be consulted to obtain this information.

Figure 9:
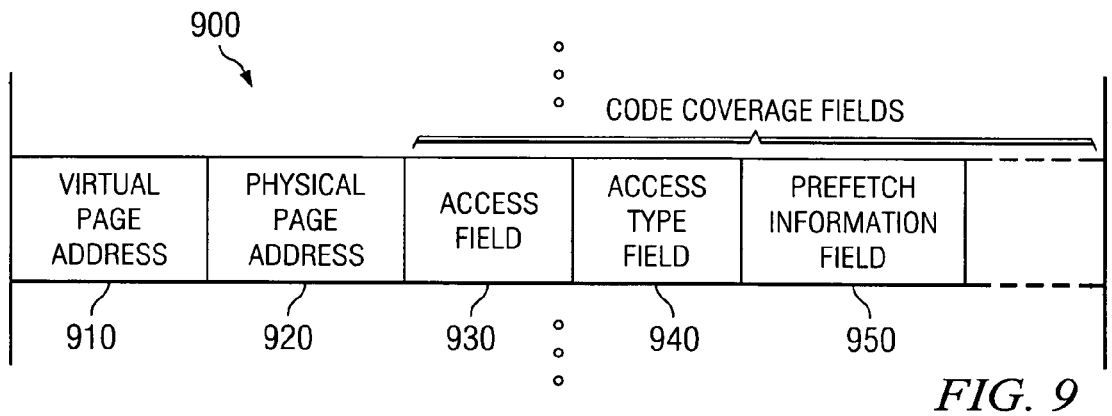
FIG. 9 is an exemplary page table entry in accordance with an exemplary embodiment of the present invention.

FIG. 9 illustrates an exemplary page table entry in accordance with an exemplary embodiment of the present invention. As shown in FIG. 9, the page table entry 900 includes field 910 for storing a virtual page address, field 920 for storing a physical page address, and code coverage fields 930-950 for storing data relating to determining code coverage. These fields are ones used by testing or performance monitoring applications for determining the code coverage of a computer application that is being tested. These code coverage fields may include, for example, an instruction access indicator, a data access indicator, or prefetch information. The values of these additional fields 930-950 may be set by different components in a processor based on information provided to these units by a testing or performance monitoring application.

For example, in a similar manner that access indicators are associated with instructions and/or portions of data as described above, the access indicators may be associated with these instructions and/or data portions within the page table. Thus, when determining whether an instruction or data portion has an associated access indicator, the virtual address of the instruction or data portion may be used to identify an entry in the page table and the values stored in additional fields 930 and 940 may be checked to see if an access indicator is associated with the physical page or a portion of the physical page. That is, if the offset associated with the virtual address falls within an offset range identified in field 930 has an access indicator stored therein, then the instruction corresponding to the virtual address has an associated access indicator. This indicator is set in the event that the instruction is executed.

Access type field 940 is used to identify the type of access that has occurred with respect to accesses to a memory location. Prefetch information field 950 may include information, such as pointers, offsets, and addresses. Thus, for example, when an instruction or portion of data must be retrieved from physical storage, the page table is consulted to identify the physical storage location of the instruction or portion of data. At the same time, fields 930-950 may be queried and the indicator in access field 930 may be set to indicate that the page has been fetched from physical storage and loaded into the memory or cache.

It should be appreciated that while FIG. 9 shows only a single field for storing an access indicator, a single field for identifying an access type, and a single field for storing prefetch information, the present invention is not limited to such. Rather, any number of fields for storing a plurality of access indicators, and the like, associated with the physical page may be used without departing from the spirit and scope of the present invention.

Figure 10:
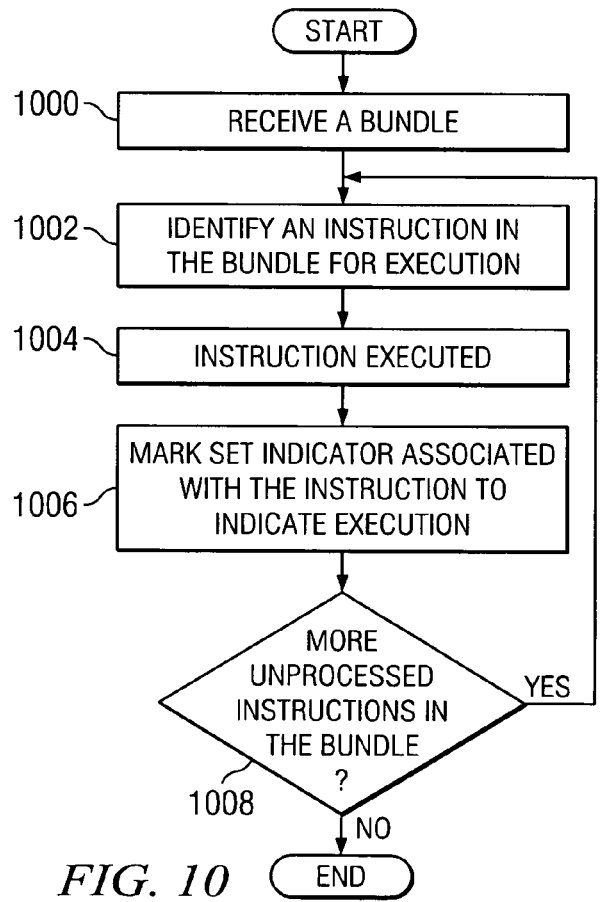
FIG. 10 is a flowchart of a process for marking access to instructions in accordance with the preferred embodiment of the present invention.

With reference now to FIG. 10, a flowchart of a process for marking access to instructions is depicted in accordance with the preferred embodiment of the present invention. The process illustrated in FIG. 10 may be implemented into an instruction cache, such as instruction cache 214 in FIG. 2.

The process begins by receiving a bundle (step 1000). Next, an instruction in the bundle for execution is identified (step 1002). Next, the instruction is executed (step 1004). In these illustrative examples, part of processing the instruction in step 1004 includes executing the instruction. Then, an indicator associated with the instruction is set to indicate execution of the instruction (step 1006). Then, a determination is made as to whether more unprocessed instructions are present in the bundle (step 1008).

If more unprocessed instructions are present in the bundle, then the process proceeds to step 1002 as described above. If additional unprocessed instructions are not present in the bundle, then the process terminates. In an alternative embodiment, one bit is set if the bundle does not have a branch and the bit indicates the last instruction executed when a branch is taken.

In this example, the instruction cache contains all of the information and has direct access to areas containing instruction access indicators to be updated to reflect changes when instructions are executed. Information regarding completed execution is provided by a completion buffer or processor units accessing the completion buffer.

Figure 11:
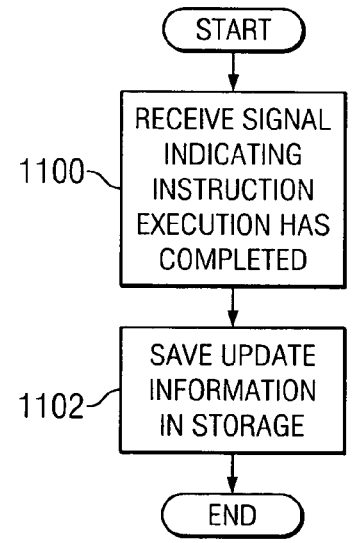
FIG. 11 is a flowchart of a process for illustrating a process followed by an instruction cache to set instruction access indicators in accordance with the preferred embodiment of the present invention.

Turning now to FIG. 11, a flowchart of a process for illustrating a process followed by an instruction cache to set instruction access indicators is depicted in accordance with the preferred embodiment of the present invention. The process illustrated in FIG. 11 may be implemented into an instruction cache, such as instruction cache 214 in FIG. 2.

The process begins by receiving a signal indicating instruction execution has completed (step 1100). In these examples, a signal is received from a completion buffer, such as completion buffer 248 in FIG. 2. This completion buffer includes information identifying the instruction for which execution has completed. Next, update information in storage is saved (step 1102), with the process terminating thereafter. In response to receiving this signal, an entry in the instruction cache may be saved into storage. The entry is identified using information received in the signal from the completion buffer. For example, the signal may indicate that the instruction corresponding to item number seven has completed execution. The information for this instruction may be located in a register created in the instruction cache to provide a fast path for performing operations. In saving information in the cache, this information is placed in another location, such as a page table or a shadow memory. This update also includes the setting of an instruction access indicator if such an indicator is associated with the instruction.

In this manner, code coverage with respect to instructions may be identified through the assistance of hardware components in a processor. This hardware assistance allows for instructions that have been executed to be identified through instruction access indicators that are set when instructions are executed. The example described above provides a fine granularity in which each executed instruction is marked. If a coarser granularity is desired, this process may be applied to portions of code, such as code segments or subroutines.

Figure 12:
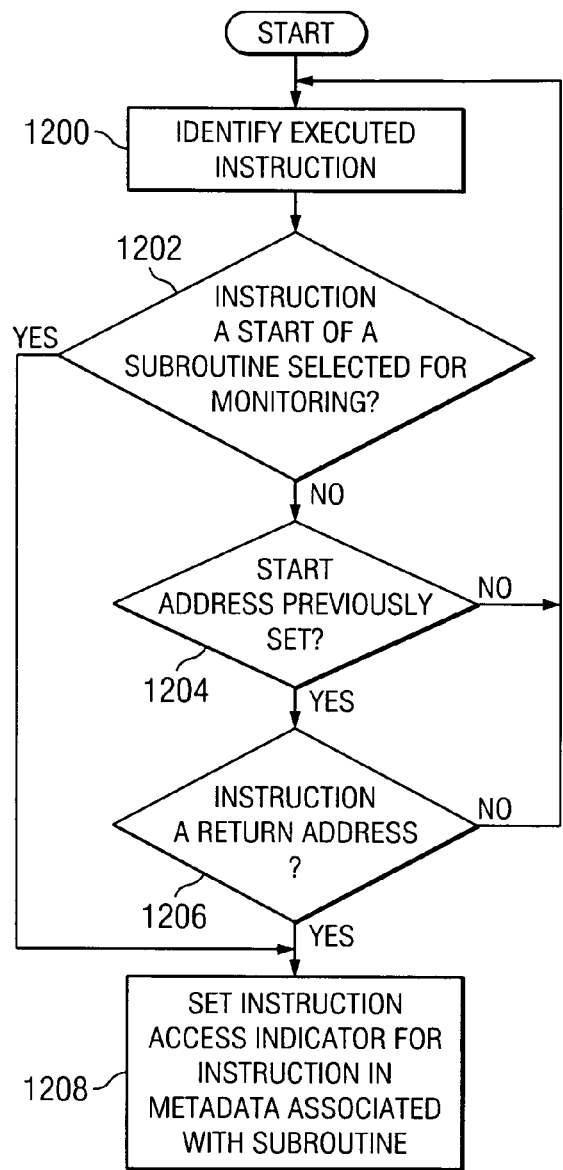
FIG. 12 is a flowchart of a process for illustrating marking access to a subroutine in accordance with the preferred embodiment of the present invention.

Turning now to FIG. 12, a flowchart of a process for illustrating marking access to a subroutine is depicted in accordance with the preferred embodiment of the present invention. The process illustrated in FIG. 12 may be implemented into an instruction cache, such as instruction cache 214 in FIG. 2.

The process begins by identifying an executed instruction (step 1200). Next, a determination is made as to whether the instruction is located at a start address of a subroutine selected for monitoring (step 1202). If the instruction is not the start of a subroutine, then a determination is made as to whether an instruction access indicator for an instruction at a start address for the subroutine was previously set (step 1204). If a determination is made that the instruction access indicator for the instruction at the start address was previously set, then a determination is made as to whether the identified instruction is one for a return address for the subroutine (step 1206). If the instruction is for a return address, then the instruction access indicator for that return instruction is set in metadata associated with the subroutine (step 1208), with the process terminating thereafter.

Referring back to steps 1206 and 1204 as described above, if the determination is no, then the process returns to step 1200. In step 1202, if the identified instruction is for the start of a subroutine, then the process proceeds to step 1208 as described above.

Figure 13:
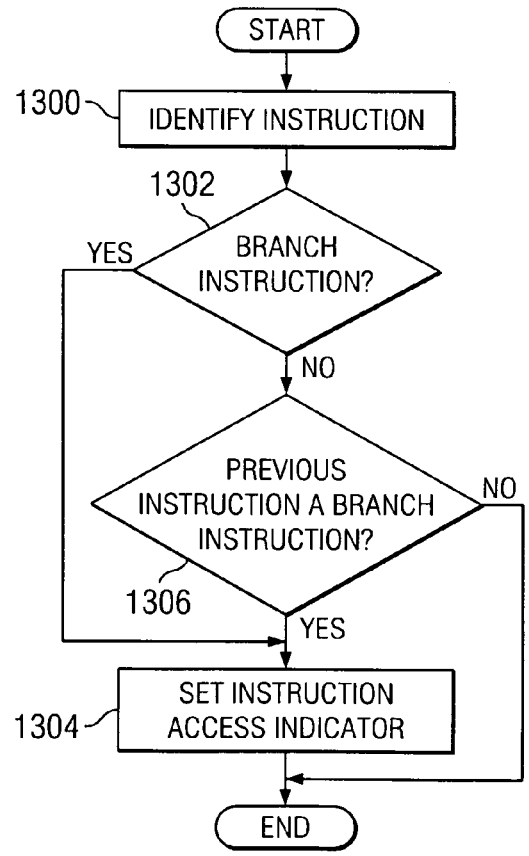
FIG. 13 is a flowchart of a process for identifying access to code segments in accordance with the preferred embodiment of the present invention.

With reference now to FIG. 13, a flowchart of a process for identifying access to code segments is depicted in accordance with the preferred embodiment of the present invention. The process illustrated in FIG. 13 may be implemented into an instruction cache, such as instruction cache 214 in FIG. 2.

The process begins by identifying instruction that is to be executed (step 1300). Next, a determination is made as to whether the identified instruction is a branch instruction (step 1302). If the instruction is a branch instruction, then the instruction access indicator associated with that instruction is set (step 1304) with the process terminating thereafter. As described above, this indicator may be implemented in a number of different ways. For example, the indicator may be located in an extra field or an unused field in the instruction, in a shadow memory, or a page table.

Referring back to step 1302, if the instruction is not a branch instruction, then a determination is made as to whether the previous instruction is a branch instruction (step 1306). If the previous instruction is a branch instruction, then the process proceeds to step 1304 to mark an instruction access indicator as described above. In step 1306, if the previous instruction is not a branch instruction then the process terminates. In essence, step 1306 in conjunction with step 1304 marks an instruction subsequent to a branch instruction when a branch does occur.

In this manner, the mechanism of the present invention provides hardware assistance for marking code segments that have been executed. By examining the instruction access indicators that have been marked, execution of code segments may be identified in determining code coverage.

Figure 14:
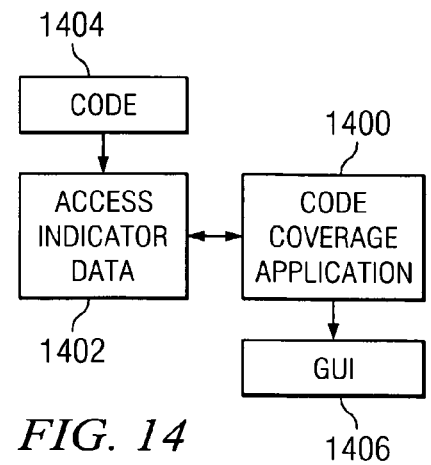
FIG. 14 is a block diagram illustrating components used to analyze code coverage data in accordance with a preferred embodiment of the present invention.

With reference now to FIG. 14, a block diagram illustrating components used to analyze code coverage data is depicted in accordance with a preferred embodiment of the present invention. With code coverage information generated by the hardware assistance mechanism of the present invention, software tools may be employed to produce a report or graphical presentation to identify areas of code that have not been executed in contrast to those that have been executed. This code coverage information also may include access to memory locations that occur during execution of the code. With this information, new testing of the code may be initiated to generate updated reports or presentations to show changes in code coverage.

In this illustrative example, code coverage application 1400 obtains access indicator data 1402 generated by the execution of code 1404. This code may be, for example, a program, an application, or code for a portion of a program or application. Access indicator data includes instruction access indicators and/or data access indicators.

These indicators are initially unset when the execution of code 1404 begins. The indicators are set when instructions are executed or data in memory locations are accessed during the execution of instructions. The execution of an instruction may cause both the instruction access indicator and the data access indicator for a memory location to be set. After execution of code 1404, a portion or all of the indicators may be set.

Code coverage application 1400 analyzes access indicator data 1402 to identify paths of instructions that have been covered or not covered during the execution of code 1404. This execution data is displayed using graphic interface (GUI) 1406. The display of this data may include highlighting or the use of different colors or graphical indicators to identify instructions that have been executed and to identify memory locations for data that has been accessed. GUI 1406 also may be used by the user to set new parameters for use in testing code 1404. When code 1404 is again tested, the new access or coverage information is then analyzed and displayed in GUI 1406 to allow the user to see how code coverage has changed.

In the illustrative examples, code coverage application 1400 may be a daemon that runs periodically to sample the coverage and provide updated reports or presentations. The user may change various parameters or may define a set of scenarios that may be used in executing code 1404.

Figure 15:
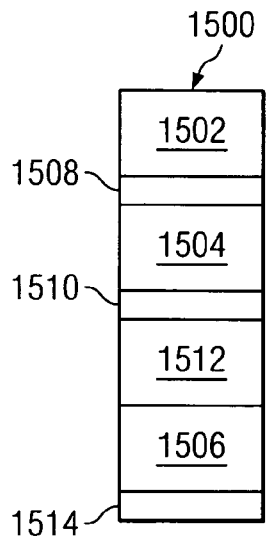
FIG. 15 is a flowchart of a process for collecting code coverage data and displaying paths that are covered and not covered within a program in accordance with the preferred embodiment of the present invention.

The code coverage data may be collected and presented to user for analysis. With reference now to FIG. 15, a diagram illustrating a presentation of executed and unexecuted instructions is depicted in accordance with the preferred embodiment of the present invention. In this illustrative embodiment, code 1500 is an example of source code that has been executed using hardware assistance to mark instruction access indicators for instructions actually executed by the processor.

In this example, sections 1502, 1504, and 1506 have been executed, while sections 1508, 1510, 1512, and 1514 are instructions that have not been executed. Code 1500 may be presented such that executed instructions are presented using one color, such as green, while unexecuted instructions are presented in another color, such as red. In this manner, the user may easily identify executed and unexecuted instructions. In another embodiment, only the executed or unexecuted instructions are displayed. Further, graphical indicators may be associated or placed next to instructions that have been executed. Many different types of presentation techniques may be used to display code coverage information. For example, the graphical user interface also may employ the use of highlighting, different fonts, and displaying only executed instructions in the display. Any type of presentation system may be used to allow the user to identify executed and unexecuted lines of code.

Figure 16:
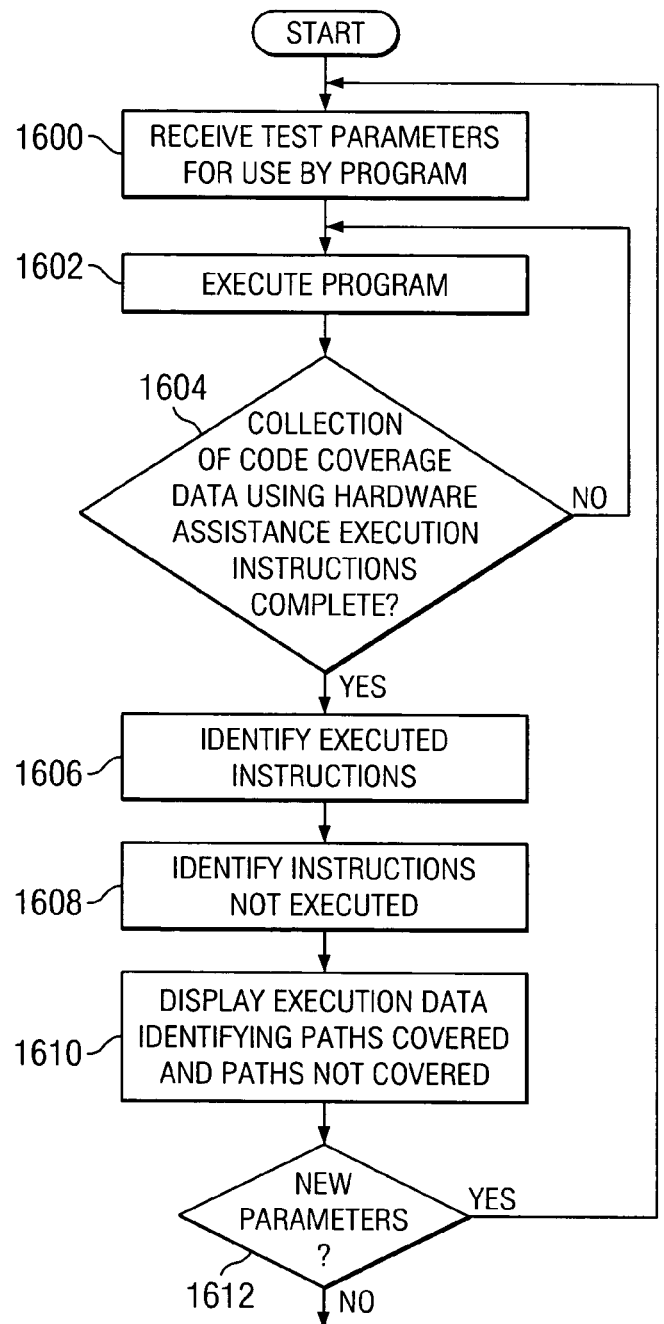
FIG. 16 is a flowchart of a process for marking access to memory locations containing data in accordance with the preferred embodiment of the present invention.

Turning now to FIG. 16, a flowchart of a process for collecting code coverage data and displaying paths that are covered and not covered within a program is depicted in accordance with the preferred embodiment of the present invention. The process illustrated in FIG. 16 may be implemented in a code coverage or testing application. The process illustrated in FIG. 16 is directed towards the collection of code coverage data with respect to the execution of instructions.

The process begins by receiving test parameters for use by the program (step 1600). The following is an example of a command line that may be entered: Test -code -data Application. In this example, Test is the testing program, Application is the application to be tested, -code indicates code coverage, and -data indicates data coverage. Next, the program is executed (step 1602). Execution of the program in step 1602 causes the generation of code coverage data in the form of access indicators, such as instruction access indicators, being set during execution of instructions for the program by the processor.

Then, a determination is made as to whether collection of code coverage data using hardware assistance execution instructions is complete (step 1604). If the collection of code coverage data is not complete, the process returns to step 1602 to continue to execute the program. Otherwise, executed instructions are identified (step 1606). Step 1606 is implemented in these illustrative examples by identifying instructions with instruction access indicators that have been set. Next, instructions not executed are identified (step 1608). Step 1608 is implemented in these illustrative examples by identifying instructions with instruction access indicators that have not been set. Then, execution data identifying paths of execution covered and paths of execution not covered are displayed (step 1610). In these examples, the display is in a GUI in which execution paths covered and not covered may be graphically presented to a user for analysis.

Next, a determination is made as to whether new parameters are present for use in executing the program (step 1612). If there are not new parameters the process terminates. If there are new parameters then the process proceeds to step 1600 as described above.

In this illustrative example, the presentation of coverage data is displayed after execution of the program. Depending on the implementation, the display of data may occur periodically during the execution of the program and may allow the user to change parameters during execution to see how code coverage changes.

The mechanism of the present invention also provides a mechanism for determining coverage in the form of data access. Indicators may be stored with metadata in which the metadata selects specific pieces of data for instrumentation. The indication of whether data has been accessed may be stored in a number of different places. For example, a word may be extended by extra bits, a shadow cache area may be provided, and a page table may be designed to include this information.

In supporting data access coverage, the compilers are updated to support producing a metadata debug section (similar to a symbols section) and the operating system in conjunction with the linker/loader and a performance monitoring or testing coverage device driver allow for specialized operational modes. These techniques mimic an extra bit or word per word of memory. Using different mechanisms, as the specified application is executed, a bit is set to indicate that the specified data areas have been executed. A variety of ways are present for indicating this support. For example, a bit may be provided for each data byte or a bit for each data word. The compiler generated metadata may provide this mapping for the hardware to use. The mapping may have data type dependencies. When a data field is accessed, the appropriate bit for a data access indicator is set. The same bit may be set for different data accesses, depending upon the mapping.

Figure 17:
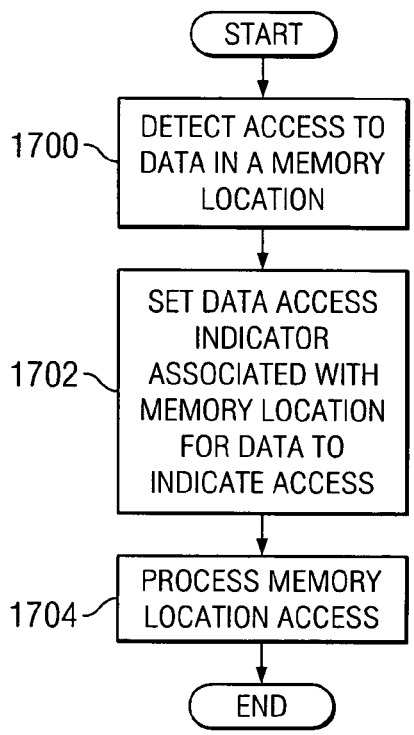
FIG. 17 is a flowchart of a process for illustrating a process followed by a data cache in accordance with the preferred embodiment of the present invention.

Turning now to FIG. 17, a flowchart of a process for marking access to memory locations containing data is depicted in accordance with the preferred embodiment of the present invention. This process is initiated whenever data access occurs in these illustrative examples. The process illustrated in FIG. 17 may be implemented in a data cache, such as data cache 216 in FIG. 2.

The process begins by detecting access to the data in a memory location (step 1700). This data access is identified by the data cache in these examples through a signal generated by a completion buffer to indicate that data has been accessed in executing an instruction. In one embodiment, the instruction executed is identified and its data operand is known by the instruction cache unit, which receives a signal from the completion buffer and sends a signal to the data cache unit indicating the data operand of the instruction has been accessed. Alternatively, the completion buffer could send an indication of the data being accessed to the data cache directly. This approach would require the data information to be known by the completion buffer.

Next, data access indicator associated with memory location containing the data to indicate access is set (step 1702). In these illustrative examples, the data access indicators may be located in a shadow memory or in a page table. The setting of the indicator occurs when the processor is in a selected or special mode to cause a bit to be set for data having a length, such as a byte, a word, or a double word. Then, memory location access is processed (step 1704), with the process terminating thereafter.

Determining testing coverage is a difficult issue in which understanding data access and data use may be helpful. In other words, it is helpful to know if an allocated array has been used or if a static piece of data has been exercised. In addition, testing data boundaries also is important in testing coverage. For example, determining whether enough space has been allocated for an array is useful. This determination may be performed by determining whether access outside of an array has occurred.

The mechanism of the present invention provides for the construction and maintenance of call flow trees that may be accessed by an executing program for use in dynamic data area coverage. When a request is made for an allocation of data, such as a malloc, a routine is called to build trees. One methodology for determining the call stack is to walk the stack to determine the calling sequence at the time of the malloc. Another methodology it to use the hardware information generated through setting data access indicators. Techniques similar to that described in United States patent application entitled "Method and Apparatus for Determining Computer Program Flows Autonomically Using Hardware Assisted Thread Stack Tracking and Cataloged Symbolic Data", Ser. 10/803,663, filed on Mar. 18, 2004, which is incorporated herein by reference. This technique is used to identify the calling sequence; hereafter called call stack. This tree is maintained in memory and may be accessed through calls such as application programming interface (API) calls to a device driver which reads the call stack information for the current thread. The process for maintaining the hardware thread maintained call stack and to convert the addresses to symbolic names also is described in United States patent application entitled "Method and Apparatus for Determining Computer Program Flows Autonomically Using Hardware Assisted Thread Stack Tracking and Cataloged Symbolic Data", Ser. No. 10,803,663, filed on Mar. 18, 2004. The call stack retrieved from the device driver is sent to the arcflow program, which walks the stack into its thread oriented trees. This process is described in United States patent application, entitled "Method and System for Merging Event-Based Data and Sampled Data Into Postprocessed Trace Output", Ser. No. 09/343,438, filed on Jun. 30, 1999. One approach involves indicating the start area, the end area, and one byte beyond the end area for flagging. Further, other statistics may also be kept in this memory area. Examples of other statistics involved using other hardware assist capabilities, the number of accesses, cache misses, cycles, etc. may be maintained.

Figure 18:
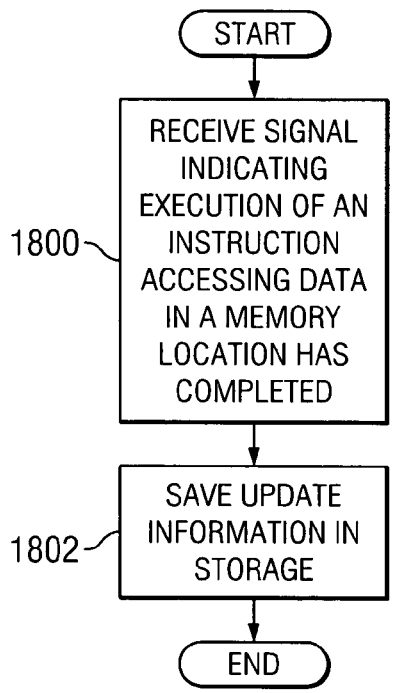
FIG. 18 is a flowchart of a process for obtaining call stack information when a dynamic memory allocation occurs during runtime in accordance with the preferred embodiment of the present invention.

Turning now to FIG. 18, a flowchart of a process for illustrating a process followed by a data cache is depicted in accordance with the preferred embodiment of the present invention. The process illustrated in FIG. 18 may be implemented in a data cache, such as data cache 216 in FIG. 2.

The process begins by a signal indicating that instruction execution accessing data in a memory location has completed is received (step 1800). This signal is typically received from a completion buffer. Update information in storage is saved (step 1802), with the process terminating thereafter. Information stored in registers in the data cache is saved. This information may be saved in a page table, as well as setting a data access indicator in another storage, such as in a shadow cache. The information saved in a page table typically contains any changes made by the data accessed by the instruction. While the information saved in the other storage involves setting a data access indicator to indicate that access has occurred to the memory location.

Figure 19:
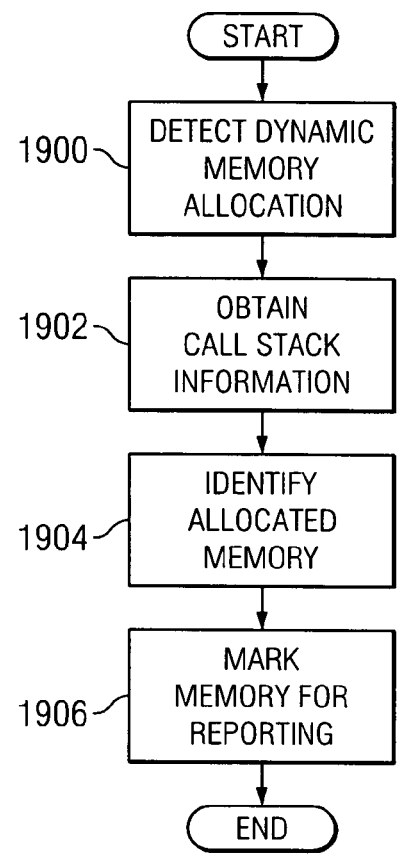
FIG. 19 is a flowchart of a process for sending information regarding data access that occurs during execution of a program when memory is deallocated in accordance with the preferred embodiment of the present invention.

Turning now to FIG. 19, a flowchart of a process for obtaining call stack information when a dynamic memory allocation occurs during runtime is depicted in accordance with the preferred embodiment of the present invention. The process illustrated in FIG. 19 may be implemented software. The process begins by detecting a dynamic memory allocation (step 1900). The dynamic memory allocation is requested during runtime when an instruction requires an allocation of memory. Next, call stack information is obtained (step 1902).

Then, allocated memory is identified (step 1904). Next, memory for reporting is marked (step 1906), with the process terminating thereafter. The memory is marked for reporting to let the hardware, such as a data cache, know when to mark access to data within the allocated memory. The memory allocation may be such that the memory allocation routine allocates more memory than specified in order to allow for checking for errors. For example, memory allocation routine may allocate an additional byte and flag the start address, the end address, and one byte beyond the end address. In other words, these flagged sections will have data access indicators set if access occurs to these marked addresses. In these examples, one byte beyond the end address is marked such that an access to this memory location causes a data access indicator to be set. In this manner, a determination is made as to whether sufficient memory has been allocated for use. If this data access indicator is set during execution of a program, then insufficient memory may have been allocated since access occurs beyond the area of memory that was allocated.

Figure 20:
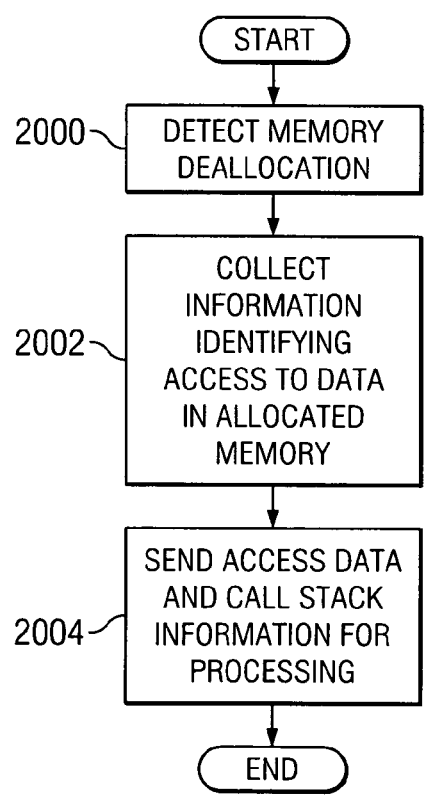
FIG. 20 is a flowchart of a process for generating a call flow tree to identify areas that have not been initialized or accessed in accordance with the preferred embodiment of the present invention.

Turning now to FIG. 20, a flowchart of a process for sending information regarding data access that occurs during execution of a program when memory is deallocated is depicted in accordance with the preferred embodiment of the present invention. The process illustrated in FIG. 20 may be implemented in software.

The process begins by memory deallocation being detected (step 2000), such as, a free request. Next, information identifying access to data in allocated memory is collected (step 2002). Then, access data and call stack information is sent for processing (step 2004), with the process terminating thereafter. This data is sent to a software tool for processing. Step 2004 may involve placing the data in a location accessible by the software tool.

In these examples, the data is sent in real time as the memory is deallocated. Other times that the information may be collected and sent for processing include sampling that is performed by a monitor process. In other cases, the information may be sent after the program has completed execution. The information identifying access to data may include information other than an identification of the memory location. For example, the information also may include an identification of the code that requested the allocation of the memory and the size of the memory that was allocated. Further, the number of accesses to the memory location may be recorded using hardware assist mechanisms described in the cross referenced applications.

Figure 21:
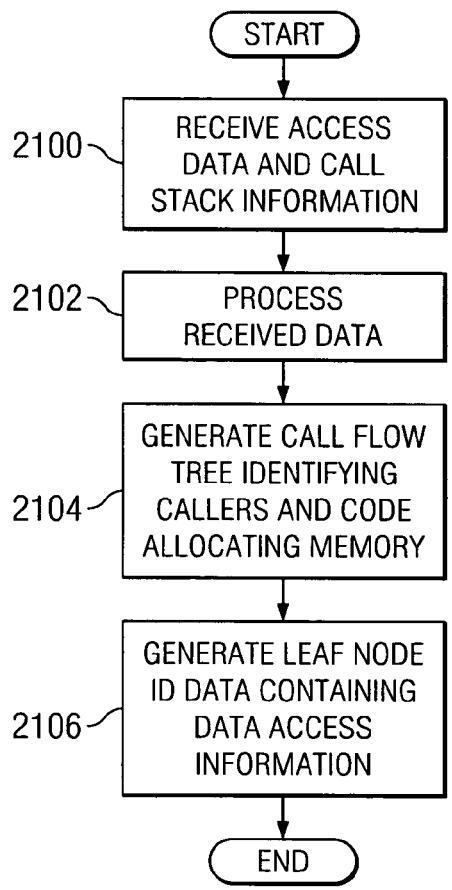
FIG. 21 is a diagram illustrating a graphical report showing coverage of data areas in accordance with a preferred embodiment of the present invention.

Turning now to FIG. 21, a flowchart of a process for generating a call flow tree to identify areas that have not been initialized or accessed is depicted in accordance with the preferred embodiment of the present invention. The process illustrated in FIG. 21 may be implemented in a software tool used to identify code coverage. This process uses the information collected in FIGS. 19 and 20 to generate a call flow tree to identify areas that have not been initialized or accessed. This call flow tree also includes information on memory locations that have been accessed, as well as, memory locations that have not been accessed.

The process begins when access data and call stack information is received (step 2100). Next, the received data and call stack information is processed (step 2102). Then, call flow tree identifying callers and code allocating memory is generated (step 2104). Next, leaf node ID data containing data access information is generated (step 2106), with the process terminating thereafter. The access information for the data area is placed into a leaf node that is associated with the node that allocated the memory in which the data was accessed.

With coverage regarding access to data areas, the mechanisms of the present invention provide information on areas of data that have not been initialized, not accessed, or accessed. In identifying these data areas, the original source code may be marked or presented in a manner to indicate which data areas have been accessed, and which data areas have not been accessed. With respect to dynamic allocation of data, the portions of the source code in which dynamic memory allocation occurs may be flagged such that memory areas allocated during execution have data access indicators marked when access occurs in those memory areas. Further, the instructions in the code may be marked to cause the hardware to set indicators when static data structures are accessed.

Figure 22:
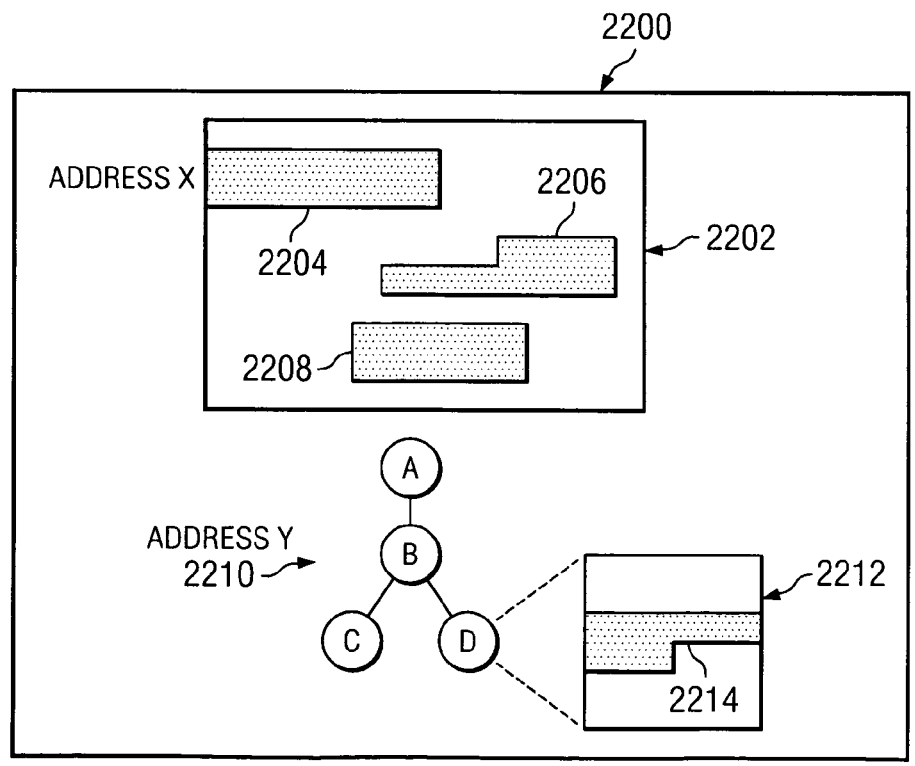
FIG. 22 is a flowchart of a process for generating the display information in accordance with the preferred embodiment of the present invention.

Turning now to FIG. 22, a diagram illustrating a graphical report showing coverage of data areas is depicted in accordance with a preferred embodiment of the present invention. In this example, report 2200 shows data access coverage in area 2202. This area shows static data areas. Sections 2204, 2206, and 2208 in area 2202 are memory locations in which data access has occurred. These sections are identified by locating data access indicators that have been set during execution of the code.

Call flow tree 2210 is an example of a call flow tree in which node D represents a section of code that dynamically allocated memory as shown in area 2212. This information in area 2212 is information located in a leaf node associated with node D in call flow tree 2210. Section 2214 in area 2212 shows portions of area 2212 that were accessed.

Figure 23:
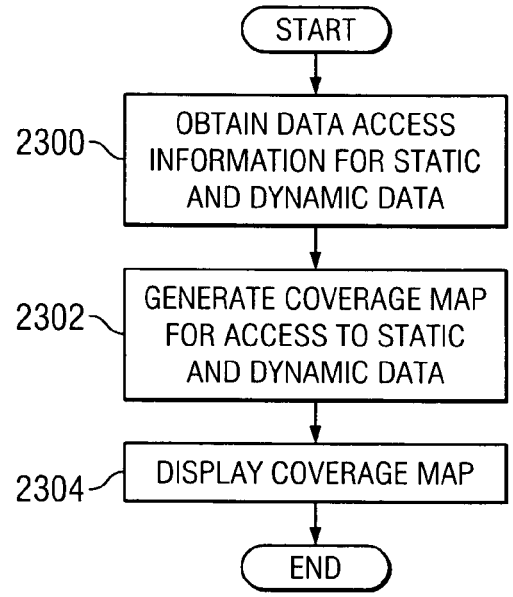
FIG. 23 is a flowchart of a process for prefetching of data into a cache using metadata in accordance with the preferred embodiment of the present invention.

Turning now to FIG. 23, a flowchart of a process for generating the display information is depicted in accordance with the preferred embodiment of the present invention. The process illustrated in FIG. 23 may be implemented into a software tool for determining coverage of data access.

The process begins by obtaining data access information for static and dynamic data (step 2300). This information includes obtaining data access indicators that were allocated for execution of the code. Other information obtained includes call flow trees generated during dynamic allocation of memory as described above.

Next, the coverage map for access to static and dynamic data is generated (step 2302). Then, the coverage map is displayed (step 2304) with the process terminating thereafter. The coverage map is similar to report 2200 in FIG. 22. The reporting program may have support to allow offsets to be used in the reporting structures. For example, the c:\program files\appl.exe(func1:100) may be used to indicate that the malloc was issued from location 100 in func1.

Processor bus speeds and memory access is significantly slower than processor speeds. It is more the case that the performance of a data processing system is gated or limited by memory access, rather than by the speed of the processor. The result of this phenomenon is the use of multi-level caching, as well as, attempts at prefetching data into these caches for quicker access to data. Attempts at prefetching, however, are usually code or stride driven and do not handle data dependant dynamic access well. Most existing approaches require the compilers or programmers to create prefetch hints in the code stream. Once the object code is generated, these hints give information that allows prefetching. This system, however, provides little opportunity to change the code. Examples include chasing references in Java objects for garbage collection or pointer chasing.

The mechanism of the present invention improves prefetching through the use of hardware assistance. With the use of metadata, a prefetch indicator may be associated with data. For example, the prefetch indicator data may indicate that the data is to be treated as a pointer to be prefetched. The prefetch indicator itself may be a pointer to the data structure. When the data is loaded into the cache the processor detects the pointer prefetch condition and prefetches the cache line pointed to by the data.

Figure 24:
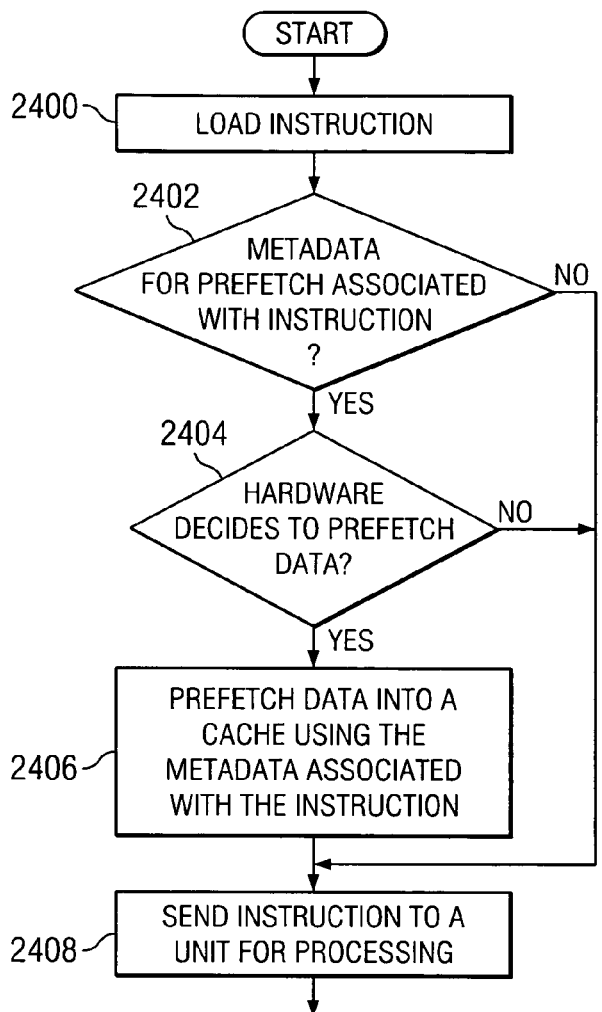
FIG. 24 is a flowchart of a process for illustrating metadata including an identification of what data is to be prefetched from the starting point in accordance with the preferred embodiment of the present invention.

Turning now to FIG. 24, a flowchart of a process for prefetching of data into a cache using metadata is depicted in accordance with the preferred embodiment of the present invention. The process illustrated in FIG. 24 may be implemented in a load/store unit in these examples. The data prefetched is a pointer in these examples.

The process begins by loading an instruction (step 2400). Next, a determination is made as to whether metadata for prefetch is associated with instruction (step 2402). In these examples, the metadata is a prefetch indicator that is associated with an instruction.

If metadata for prefetch is associated with instruction, then a determination is made as to whether hardware decides to prefetch data (step 2404). In a preferred embodiment, the instruction cache determines when and if the instruction cache will speculatively prefetch. For example, the instruction cache may determine that it has no outstanding cache misses and it has cache entries that may be replaced that have not been used for quite some time. In this case, the instruction cache speculatively prefetches. However, if the instruction cache has outstanding misses and/or no convenient cache lines to replace, it may not speculatively prefetch. A threshold may be set for the number of cache misses and/or for a number of replaceable cache lines to determine whether the instruction cache will prefetch data when a prefetch indicator is present. For example, a prefetch may occur if outstanding cache misses are less than a selected threshold. Prefetching also may occur in these illustrative examples if replacement of cache lines is desired and if the number of cache lines chosen to be replaced are greater than a selected threshold. The load store unit may issue request to speculatively load into the cache unit, but the cache unit determines if it will actually prefetch.

Alternatively, a load store unit may make the determination as to whether to speculatively load into the cache unit depending upon the hardware implementation. If the hardware decides to prefetch data, then data is prefetched into a cache using the metadata associated with the instruction (step 2406). In these examples, the data is a pointer. This pointer is a pointer to a data structure or a block of data. Next, the instruction is sent to a unit for processing (step 2408), with the process terminating thereafter.

Referring back to step 2404, if hardware decides not to prefetch data then the process returns to step 2408 as described above. In step 2302, if metadata for prefetch is not associated with instruction, then the process proceeds to step 2408 as described above. In these examples, the hardware may send the instruction to a unit for processing before, at the same time, or after the hardware issues an indication that a prefetch should occur.

In addition to prefetching a pointer to a data structure or a block of data, the mechanism of the present invention provides an ability to prefetch data from a memory location within the data structure. A stride or offset in conjunction with the pointer may be used to identify the data to be prefetched. Alternatively, an address may be used to identify the location of the data that is desired.

Figure 25:
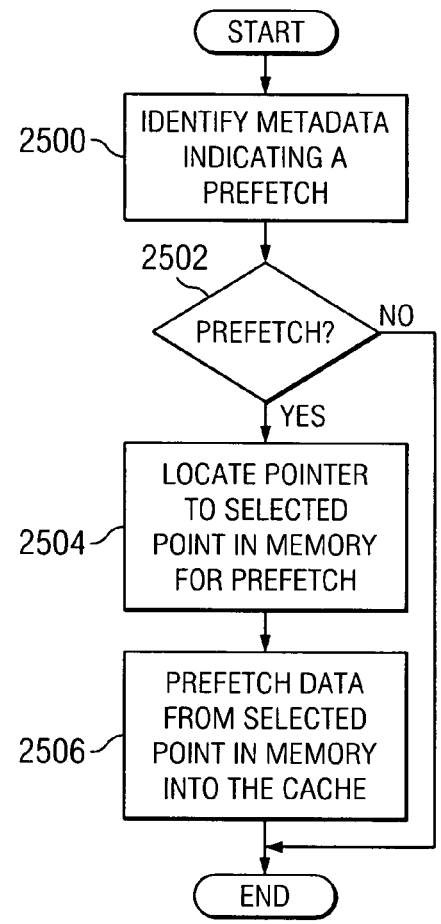
FIG. 25 is a flowchart of a process for illustrating metadata including an identification of what data is to be prefetched from the starting point in accordance with the preferred embodiment of the present invention.

Turning now to FIG. 25, a flowchart of a process for illustrating metadata including an identification of what data is to be prefetched from the starting point is depicted in accordance with the preferred embodiment of the present invention. The process illustrated in FIG. 25 may be implemented into a load store unit, such as load store unit 228 in FIG. 2.

The process begins detecting metadata which indicates a prefetch (step 2500). The metadata may include an identification of what data is to be prefetched from a data structure identified by the pointer. This metadata may include a prefetch indicator in the form of a pointer. The metadata also may include an identification of the data itself through the use of an offset or address. A determination is made as to whether a prefetch should occur based on the state of the cache unit (step 2502). The prefetches of these examples are speculative with the processes being performed selectively depending on the state of the cache unit. For example, if a number of cache misses exceeding some value has occurred, the prefetch does not occur and the process terminates.

In step 2502 if the prefetch is to occur, a selected point in memory for the prefetch is located (step 2504). This selected point memory may be identified in the metadata using a pointer and an offset or stride, or a memory address. Next, data is prefetched from a selected point in the memory into the cache (step 2506), with the process terminating thereafter. Referring to step 2502, if the prefetch does not occur, the process terminates.

Thus, the present invention provides an improved method, apparatus, and computer instructions for providing hardware assistance for code coverage. The mechanisms of the present invention allow for an ability to monitor the execution of instructions and access to memory locations during execution of a program. Access indicators are provided for indicating instruction execution or access to data in memory locations. The setting of these indicators are performed by hardware, such as different components in a processor. In this manner, software tools may obtain and analyze coverage data with better coverage and avoiding changing the code being tested.

Further, the steps illustrated in the flowcharts described above, with respect to hardware providing assistance in determining coverage in program execution, provide a logical flow of processes that may be executed by different components in hardware. In particular, these steps may be implemented as microcode or hardware logic in a processor. Microcode, in these examples, are the lowest level instructions that directly control a processor. A single machine language instruction typically translates into several microcode instructions. Microcode may be in hardware or software form. In many modern processors, the microcode is hard-wired into the processors.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, it is important to note that different processor architectures may distribute the functions specified in this application across different units with a variety of mechanisms used to communicate information across the units. Additionally, although specific processor units have been described as implementing the functions of the present invention, these different functions may be incorporated into other processor units within the hardware. Further, the steps described in the figures may be implemented as either hardware circuitry or as instructions for specific use by the different processor units within a processor, such as microcode for use by an execution unit.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for providing hardware assistance to prefetch data during execution of code by a processor in the data processing system, the method comprising:

responsive to loading of an instruction in the code into a cache, determining, by a processor unit, whether metadata for a prefetch is present for the instruction, wherein the metadata comprises a prefetch indicator that is associated with the instruction and stored in a prefetch indicator field of a page table;

storing a first threshold value and a second threshold value in a first threshold field and a second threshold field, respectively, of the page table in association with the prefetch indicator field and a plurality of counter fields, wherein the first threshold value specifies a maximum counter value in an associated counter field and wherein the second threshold value specifies a minimum counter value in an associated counter field;

responsive to a determination of the metadata being present for the instruction, determining whether data is to be prefetched, wherein the step of determining whether data is to be prefetched comprises determining whether a first counter value in an associated counter field representing a number of outstanding cache misses is less than the first threshold value in the first threshold field, and determining whether a second counter value in an associated counter field representing a number of cache lines chosen to be replaced is greater than the second threshold value in the second threshold field; and responsive to a determination that data is to be prefetched, prefetching data, from within a data structure using the metadata, into the cache in the processor, wherein the step of prefetching comprises prefetching the data responsive to determining that the first counter value in an associated counter field representing the number of outstanding cache misses is less than the first threshold value in the first threshold field, and responsive to a determination that the second counter value in an associated counter field representing the number of cache lines chosen to be replaced is greater than the second threshold value in the second threshold field.

2. The method of claim 1, wherein the prefetching step includes:
retrieving the data from within the data structure using a pointer and an offset value.

3. The method of claim 1, wherein the prefetching step includes:
retrieving the data from the data structure using an address.

4. The method of claim 1, wherein the processor unit is selected from one of an instruction cache and a load/store unit.

5. The method of claim 1, wherein the cache is an instruction cache.

6. The method of claim 2, wherein the metadata includes the pointer and the offset value.

7. A method in a data processing system for providing hardware assistance to prefetch data during execution of code by a processor in the data processing system, the method comprising:

responsive to loading of an instruction in the code into an instruction cache, determining, by a processor unit, whether metadata for a prefetch is present for the instruction, wherein the processor unit comprises one of the instruction cache and a load/store unit, and wherein the metadata comprises a prefetch indicator associated with the instruction and stored in a prefetch indicator field of a page table, and comprises a pointer and an offset value;

storing a first threshold value and a second threshold value in a first threshold field and a second threshold field, respectively, of the page table in association with the prefetch indicator field and a plurality of counter fields, wherein the first threshold value specifies a maximum counter value in an associated counter field and wherein the second threshold value specifies a minimum value in an associated counter field;

responsive to a determination of the metadata being present for the instruction, determining whether data is to be prefetched, wherein the step of determining whether data is to be prefetched comprises determining whether a first counter value in an associated counter field representing a number of outstanding cache misses is less than the first threshold value in the first threshold field, and determining whether a second counter value in an associated counter field representing a number of cache lines chosen to be replaced is greater than the second threshold value in the second threshold field; and responsive to a determination that data is to be prefetched, prefetching data, from within a data structure into the instruction cache in the processor using the pointer and the offset value, wherein the step of prefetching comprises prefetching the data responsive to determining that the first counter value in an associated counter field representing the number of outstanding cache misses is less than the first threshold value in the first threshold field, and responsive to a determination that the second counter value in an associated counter field representing the number of cache lines chosen to be replaced is greater than the second threshold value in the second threshold field.

* * * * *